US012652168B2

(12) United States Patent
Guan et al.

(10) Patent No.: US 12,652,168 B2
(45) Date of Patent: Jun. 9, 2026

(54) SYSTEM AND METHOD FOR SECURITY AGAINST BOUNDED-STORAGE MASS SURVEILLANCE

(71) Applicant: NTT Research, Inc., Sunnyvale, CA (US)

(72) Inventors: Jiaxin Guan, New York, NY (US); Daniel Wichs, Boston, MA (US); Mark Zhandry, New York, NY (US)

(73) Assignees: NTT Research, Inc., Sunnyvale, CA (US); The Trustees of Princeton University, Princeton, NJ (US)

( * ) Notice: Subject to any disclaimer, the term of this patent is extended or adjusted under 35 U.S.C. 154(b) by 146 days.

(21) Appl. No.: 18/437,215

(22) Filed: Feb. 8, 2024

(65) Prior Publication Data

US 2024/0267213 A1 Aug. 8, 2024

Related U.S. Application Data

(60) Provisional application No. 63/483,966, filed on Feb. 8, 2023.

(51) Int. Cl.
H04L 9/08 (2006.01)
(52) U.S. Cl.
CPC .......... H04L 9/0869 (2013.01); H04L 9/0825 (2013.01)
(58) Field of Classification Search
CPC .... H04L 9/0869; H04L 9/0825; H04L 9/3093
See application file for complete search history.

(56) References Cited

U.S. PATENT DOCUMENTS

| | | | | |
|---|---|---|---|---|
| 8,254,574 | B2 * | 8/2012 | Reznik | H04L 9/0875 |
| | | | | 380/268 |
| 12,323,513 | B1 * | 6/2025 | Zhandry | H04L 9/3247 |
| 2008/0313473 | A1 * | 12/2008 | Provencher | G06F 21/554 |
| | | | | 713/193 |
| 2016/0277189 | A1 * | 9/2016 | Ahn | H04L 9/3273 |
| 2019/0088174 | A1 * | 3/2019 | Allard | G09F 19/22 |
| 2021/0314748 | A1 * | 10/2021 | Cominetti | H04W 12/069 |
| 2021/0397749 | A1 * | 12/2021 | Sadjadpour | H04L 9/0656 |
| 2022/0245221 | A1 * | 8/2022 | Gabrys | H04L 9/0869 |
| 2024/0022403 | A1 * | 1/2024 | Bandy | H04L 9/0869 |
| 2024/0396729 | A1 * | 11/2024 | Datta | H04L 9/0869 |
| 2025/0022391 | A1 * | 1/2025 | Allard | G09F 13/16 |

* cited by examiner

*Primary Examiner* — Phy Anh T Vu
(74) *Attorney, Agent, or Firm* — CipherLaw

(57) ABSTRACT

The present disclosure relates to a computerized method and system for message encryption in a multi-user setting. The method involves receiving a message of arbitrary length for each user, storing the message in a computerized data store, and executing a setup to generate a master secret and public keys. A random variable is generated, and a function is defined based on this variable. A second secret is derived using a functional encryption scheme, resulting in a derived secret. The message is encrypted by generating a first random string, a second partially random string, and a ciphertext. The system also includes a method for decrypting the encrypted message, processing the derived secret and ciphertext to derive a string, and deriving a plaintext message from this string.

16 Claims, 5 Drawing Sheets

Computer System 500

SYSTEM AND METHOD FOR SECURITY AGAINST BOUNDED-STORAGE MASS SURVEILLANCE

CROSS-REFERENCE TO RELATED APPLICATION

This application claims the benefit of U.S. Provisional Application Ser. No. 63/483,966 filed Feb. 8, 2023, the content of which is incorporated by reference herein in its entirety.

STATEMENT OF GOVERNMENT SUPPORT

This invention was made with government support under Grant No. CNS1749731 awarded by the National Science Foundation. The government has certain rights in the invention.

FIELD OF THE INVENTION

The present disclosure pertains to the field of cryptography and, more specifically, to the use of incompressible cryptographic techniques to thwart mass surveillance efforts.

BACKGROUND OF THE INVENTION

Mass surveillance represents a systematic effort to collect and analyze large volumes of data across various communication channels. This practice, often conducted by governmental or large corporate entities, poses a substantial threat to individual privacy and the confidentiality of sensitive information. Traditional encryption methods have served as a primary defense against such surveillance, but as computational power and data analysis techniques have advanced, these methods have become increasingly vulnerable to sophisticated attacks.

One of the primary challenges in protecting against mass surveillance is the ability of surveillance systems to store vast amounts of encrypted data. Over time, as encryption keys are discovered or as computational methods improve, previously unintelligible data can be decrypted and analyzed. This retrospective decryption capability undermines the long-term security of encrypted communications.

Incompressible cryptography emerges as a solution to this problem by ensuring that encrypted messages do not exhibit patterns that allow for efficient compression and storage. By producing ciphertexts that are indistinguishable from random data, incompressible cryptographic methods aim to maximize the storage requirements for any entity attempting to archive large quantities of encrypted data. This approach is based on the premise that, by increasing the cost and complexity of storing intercepted encrypted messages, it becomes impractical for surveillance entities to maintain and later decrypt the vast amounts of data they collect.

Furthermore, incompressible cryptography can be designed to ensure that the ciphertext length is independent of the message length, thereby obfuscating the amount of information contained within a message. This property adds another layer of security, as it prevents potential attackers from inferring message content based on ciphertext length.

Despite the potential of incompressible cryptography to enhance privacy and security, there remain challenges in its implementation and deployment, particularly in multi-user settings where the scalability of cryptographic operations is a concern. The present disclosure seeks to address these challenges by introducing novel systems and methods that leverage incompressible cryptographic techniques to provide secure message transmission and reception in a manner that is resistant to mass surveillance, even in the face of bounded-storage capabilities.

BRIEF SUMMARY OF THE INVENTION

Consider a state-level adversary who observes and stores large amounts of encrypted data from all users on the Internet, but does not have the capacity to store it all. Later, it may target certain "persons of interest" in order to obtain their decryption keys. We would like to guarantee that, if the adversary's storage capacity is only (say) 1% of the total encrypted data size, then even if it can later obtain the decryption keys of arbitrary users, it can only learn something about the contents of (roughly) 1% of the ciphertexts, while the rest will maintain full security. This can be seen as an extension of incompressible cryptography (Dziembowski CRYPTO '06, Guan, Wichs and Zhandry EUROCRYPT '22) to the multi-user setting. We provide solutions in both the symmetric key and public key setting with various trade-offs in terms of computational assumptions and efficiency.

As the core technical tool, we study an information-theoretic problem which we refer to as "somewhere randomness extraction". Suppose $X_1, \ldots, X_t$ are correlated random variables whose total joint min-entropy rate is $\alpha$, but we know nothing else about their individual entropies. We choose t random and independent seeds $S_1, \ldots, S_t$ and attempt to individually extract some small amount of randomness $Y_i = \text{Ext}(X_i; S_i)$ from each $X_i$. We'd like to say that roughly an $\alpha$-fraction of the extracted outputs $Y_i$ should be indistinguishable from uniform even given all the remaining extracted outputs and all the seeds. We show that this indeed holds for specific extractors based on Hadamard and Reed-Muller codes.

Bounded-Storage Mass Surveillance. We consider a scenario where a powerful (e.g., state-level) adversary wants to perform mass surveillance of the population. Even if the population uses encryption to secure all communication, the adversary can collect large amounts of encrypted data from the users (e.g., by monitoring encrypted traffic on the Internet). The data is encrypted and hence the adversary does not learn anything about its contents when it is collected. However, the adversary may store this data for the future. Later, it may identify various "persons of interest" and perform expensive targeted attacks to get their secret keys (e.g., by remote hacking or by physically compromising their devices). We will assume the adversary is capable of eventually getting any secret key of any user of its choosing. Can we still achieve any meaningful notion of security against such mass-surveillance?

One option is to rely on cryptosystems having forward secrecy, which exactly addresses the problem of maintaining security even if the secret key is later compromised. Unfortunately, forward-secure encryption schemes inherently require either multi-round interaction between the sender and receiver or for the receiver to perform key updates, both of which can be impractical or impossible in many natural scenarios. Without these, it may seem that no reasonable security is possible—if the adversary collects all the ciphertexts and later can get any secret key, clearly it can also get any plaintext!

In this work, we restrict the adversary to have bounded storage, which is much smaller than the total of size of all the encrypted data it can observe. This is a reasonable assumption since the total communication of an entire population is likely huge. Global annual Internet traffic has long surpassed 1 zettabyte ($10^{21}$ bytes), while total worldwide datacenter storage is only a couple zettabytes in 2022. As a running example throughout the introduction, we will assume that the adversary's storage capacity is 1% of the total encrypted data size. We allow the adversary to observe all the encrypted data simultaneously and then compress it in some arbitrary way to fit within its storage budget. Later, the adversary can get any secret key of any user of its choosing, and eventually it may even get all the keys of all the users. What kind of security guarantees can we provide in this setting?

Clearly, the adversary can simply store 1% of the ciphertexts and discard the remaining 99%, which will allow it to later compromise the security of 1% of the users by getting their secret keys. While one may pessimistically see this as a significant privacy violation already, we optimistically regard this as a potentially reasonable privacy outcome that's vastly preferable to the adversary being able to compromise all the users. For example, if the adversary later chooses a random user and wants to learn something about their data, it will only be able to do so with 1% probability, even if it can get their secret key. But can we argue that this is the best that the adversary can do? In particular, we'd like to say that, no mater what compression strategy the adversary employs, it will be unable to learn anything about the contents of 99% of the ciphertexts, even if it later gets all the secret keys. Unfortunately, this is not generically true. For example, the adversary could store the first 1% of the bits of every ciphertext. If the encryption scheme is (e.g.) the one-time pad, then an adversary who later learns the secret keys would later be able to learn the first 1% of every encrypted message of every user, which may provide a pretty good idea of the overall message contents. In fact, it can get even worse than this. If the encryption scheme is fully homomorphic, the adversary can individually compress each ciphertext into a small evaluated ciphertext encrypting some arbitrary predicate of the data (e.g., was the message insulting of the supreme leader), and therefore learn the outcome of this predicate about the encrypted data of every user. Even worse, if the encryption scheme is multi-key fully homomorphic, the adversary can derive a compressed ciphertext that encrypts the output of a joint computation over all the data of all the users, as long as the output is sufficiently small. Thus, in general, an adversary whose storage capacity is only 1%, may still be able to learn some partial information about the encrypted messages of a 100% of the users. The question is then, whether or not it is indeed possible to guarantee only 1% of users are compromised, and if so to actually design such a scheme.

Connection to Incompressible Cryptography. Encryption schemes that offer protection against bounded-storage mass surveillance can be seen as a generalization of incompressible encryption to the setting of multiple ciphertexts. To clarify the distinction, we refer to the earlier notion of incompressible encryption as individually incompressible and our new notion as multi-incompressible.

In an individually incompressible encryption scheme, we can make the size of a ciphertext flexibly large, and potentially huge (e.g., many gigabytes). An adversary observes a single ciphertext, but cannot store it in its entirety and can instead only store some compressed version of it. Security dictates that even if the adversary later gets the user's secret key, it cannot learn anything about the encrypted message. Other work gave a construction of one-time symmetric-key encryption with information-theoretic security in this setting, and other work showed how to achieve public-key encryption in this setting, under the minimal assumption that standard public-key encryption exists. Other work also constructed such public-key encryption schemes having rate 1, meaning that the size of the message can be almost as large as the ciphertext size, and the latter work even showed how to do so under specific but standard public-key assumptions.

In our new notion of multi-incompressible encryption, we also have the flexibility to make the ciphertext size arbitrarily large. But now the adversary observes a large number of ciphertexts from many users and compresses them down to something that's roughly an $\alpha$-fraction of the size of all the original ciphertexts, for some $\alpha$. In particular, the adversary's storage may be much larger than a single ciphertext. Later the adversary gets all the secret keys, and we want to say that the adversary can only learn something about a (roughly) $\alpha$-fraction of the messages, but cannot learn anything about the rest.

Our new notion of multi-incompressibility implies individual incompressibility. In particular, in the case of a single ciphertext, unless the adversary stores essentially all of it (i.e., $\alpha \approx 1$), it cannot learn anything about the encrypted message (=100% of the messages). But our notion is significantly more general. For example, individual incompressibility does not even offer any guarantees if an adversary can take even 2 ciphertexts and compress them down to the size of 1, while multi-incompressibility ensures that one of the messages stays secure.

Formalizing multi-incompressibility is tricky: the natural indistinguishability-based approach would be to insist that the encryptions of two lists of messages are indistinguishable. But unlike individually incompressible encryption, in our setting the adversary can always learn something, namely the messages contained in ciphertexts it chose to store. We therefore need a fine-grained notion which captures that some messages to be learned, but other messages remain completely hidden. We give details on our solution below.

Extracting randomness against correlated sources. Before getting to our results, we discuss randomness extraction, which is a central tool in all existing constructions of incompressible encryption. A randomness extractor Ext takes as input a source of imperfect randomness X and uses it to distill out some (nearly) uniformly random string Y. Here, we consider seeded extractors, which use a public uniformly random seed S as a catalyst to extract $Y=Ext(X; S)$, such that Y should be (nearly) uniform even conditioned on the seed S.

While randomness extraction is very well studied, it is most often in the single-use case, where a single string $Y=Ext(X; S)$ is extracted from a single source X having sufficient entropy. Here we ask: what if many strings $Y_i=Ext(X_i; S_i)$ are extracted from multiple sources $X_i$ respectively (using independent random seeds $S_i$), but where the sources $X_i$ may be arbitrarily correlated? What guarantees can be made? We consider the case where we only know that the total joint entropy of all the sources is high, but we know nothing else about their individual entropies; indeed some of the sources may have no entropy at all.

1 Summary of Results 1.1 Results.

Formalizing Multi-user Incompressible Encryption. We first provide definitions for multi-user incompressible encryption. We depart from the indistinguishability-based definitions of the prior work on incompressible cryptography, and instead give a simulation-based definition. Essentially, the definition says that anything that an adversary can learn by taking many ciphertexts of different users, compressing them down sufficiently, and later getting all the secret keys, can be simulated by a simulator that can only ask to see some small fraction of the plaintexts but does not learn anything about the remaining ones. In the single-instance case, this definition implies indistinguishability-based security, but appears stronger. Nevertheless, existing constructions and proofs are readily adapted to satisfy simulation security. The distinction becomes more important in the multi-user setting, however, where simulation security allows us to naturally define what it means for some messages to be revealed and some to remain hidden.

Somewhere Randomness Extractors. As our main technical tool, we explore a new kind of extractor that we call a somewhere randomness extractor, which aims to solve the extraction problem outlined above. Syntactically, this is a standard extractor $Y=\text{Ext}(X; S)$ that takes as input a source X and a seed S and outputs some short randomness Y. However, we now imagine that the extractor is applied separately to t correlated sources $X_i$, with each invocation using an independent seed $S_i$, to derive extracted values $Y_i=\text{Ext}(X_i; S_i)$. The only guarantee on the sources is that the total joint min-entropy of $X=(X_1, \ldots, X_t)$ is sufficiently high. Any individual source $X_i$, however, may actually be deterministic (have 0 entropy), in which case the corresponding extracted value $Y_i$ is of course not random. However, provided the total min-enropy rate of X is high, it is guaranteed that many of the t extracted values are statistically-close uniform. Ideally, if the joint min-entropy rate of X is $\alpha$, we would hope that roughly $\alpha t$ of the extracted values are uniform.

Formalizing the above requires some care. For example, it may be the case that X is chosen by selecting a random index $i^* \leftarrow [t]$, setting $X_{i*}$ to be all 0's, and choosing the remaining block $X_j$ for $j \neq i^*$ uniformly at random. In that case X has a very high entropy rate, but for any fixed index i, the min-entropy of $X_i$ is small (at most log t since with polynomial probability 1/t the value of $X_i$ is all 0's), and not enough to extract even 1 bit with negligible bias. Therefore, we cannot argue that $Y_i=\text{Ext}(X_i; S_i)$ is close to uniform for any particular index i! Instead, we allow the set of indices i, for which $Y_i$ is close to uniform, itself be a random variable correlated with X. (See Definition 3.)

We show constructions of somewhere randomness extractors nearing the optimal number of uniform extracted values. In particular, we show that if the joint min-entropy rate of $X=(X_1, \ldots, X_t)$ is $\alpha$ then there exists some random variable $I_X$ denoting a subset of $\approx \alpha \cdot t$ indices in [t] such that nobody can distinguish between seeing all the extracted values $Y_i=\text{Ext}(X_i; S_i)$ versus replacing all the $Y_i$ for $i \in I_X$ by uniform, even given all the seeds $S_i$. (See Corollary 1.) Our constructions are based on Hadamard codes (long seed) and Reed-Muller codes (short seed). While the constructions themselves are standard, our analysis is novel, leveraging the list-decodability of the codes, plus a property we identify called hinting. Hinting roughly means that the values of $\{\text{Ext}(x; S_i)\}_i$ on some particular exponentially large set of pairwise independent seeds $S_i$ can be compressed into a single small hint, of size much smaller than x. This hinting property is a crucial feature in the local list-decoding algorithms for these codes, but appears not to have been separately formalized/utilized as a design goal for an extractor.

Applications. We then show that somewhere randomness extraction can be used essentially as a drop-in replacement for standard randomness extractors in prior constructions of individual incompressible encryption, lifting them to multi-incompressible encryption. As concrete applications, we obtain multi-incompressible encryption in a variety of settings:

A symmetric key scheme with information-theoretic security, by replacing the extractor.

A "rate-1" symmetric key scheme, meaning the ciphertext is only slightly larger than the message. Here, we assume either decisional composite residuosity (DCR) or learning with errors (LWE).

A public key scheme, assuming any ordinary public key encryption scheme.

A rate-1 public key scheme. The scheme has large public keys.

A rate-1 public key scheme that additionally has succinct public keys, assuming general functional encryption.

Multiple ciphertexts per user. Prior work, in addition to only considering a single user, also only considers a single ciphertext per user. Perhaps surprisingly, security does not compose, and indeed for any fixed secret key size, we explain that simulation security for unbounded messages is impossible.

We therefore develop schemes for achieving a bounded number of ciphertexts per user. We show how to modify each of the constructions above to achieve multi-ciphertext security under the same assumptions.

The Random Oracle Model. We show how to construct symmetric key multi-user incompressible encryption with an unbounded number of ciphertexts per user and also essentially optimal secret key and ciphertext sizes, from random oracles. This shows that public key tools are potentially not inherent to rate-1 symmetric incompressible encryption.

1.2 Techniques: Somewhere Randomness Extraction

We discuss how to construct a somewhere randomness extractor Ext. Recall, we want to show that, if the joint min-entropy rate of $X=(X_1, \ldots, X_t)$ is $\alpha$ then there exists some random variable $I_X$ denoting a subset of $\approx \alpha \cdot t$ indices in [t] such that the distribution $(S_i, Y_i=\text{Ext}(X_i; S_i))_{i \in [t]}$ is statistically indistinguishable from $(S_i, Z_i)_{i \in [t]}$ where $Z_i$ is uniformly random for $i \in I_X$ and $Z_i=Y_i$ otherwise.

1.3 Techniques: Multi-Incompressible Encryption

We then move to considering incompressible encryption in the multi-user setting.

Definition. We propose a simulation-based security definition for multi-incompressible encryption. Roughly, the simulator first needs to simulate all the ciphertexts for all the instances without seeing any of the message queries, corresponding to the fact that at this point the adversary can't learn anything about any of the messages. To model the adversary then learning the secret keys, we add a second phase where the simulator can query for a subset of the messages, and then must simulate all the private keys. We require that no space-bounded distinguisher can distinguish between the receiving real encryptions/real private keys vs receiving simulated encryptions/keys. The number of messages the simulator can query will be related to the storage bound of the distinguisher.

Upgrading to multi-incompressible encryption using somewhere randomness extraction. All prior standard-model constructions of individual incompressible encryption utilize a randomness extractor. For example, prior work gives the following simple construction of a symmetric key incompressible encryption scheme:

The secret key k is parsed as (s, k') where s is a seed for a randomness extractor, and k' is another random key.

To encrypt a message m, choose a large random string R, and output $c=(R, d=\text{Ext}(R; s) \oplus k' \oplus m)$.

The intuition for (individual) incompressible security is that an adversary that cannot store essentially all of c can in particular not store all of R, meaning R has min-entropy conditioned on the adversary's state. The extraction guarantee then shows that Ext(R; s) can be replaced with a random string, thus masking the message m.

We demonstrate that our somewhere randomness extractors can be used as a drop-in replacement for ordinary random extractors in all prior constructions of individual incompressible encryption, upgrading them to multi-incompressible encryption. In prior work, this is almost an immediate consequence of our somewhere random extractor definition. Our simulator works by first choosing random s for each user, and sets the ciphertexts of each user to be random strings. Then it obtains from the somewhere randomness extractor guarantee the set of indices i where $Y_i$ is close to uniform. For these indices, it sets k' to be a uniform random string. This correctly simulates the secret keys for these i.

For i where $Y_i$ is not uniform, the simulator then queries for messages for these i. It programs k' as k'=d⊕Ext(R; s)⊕m; decryption under such k' will correctly yield m. Thus, we correctly simulate the view of the adversary, demonstrating multi-incompressible security.

Remark 1. The set of indicies where $Y_i$ is uniform will in general not be efficiently computable, and somewhere randomness extraction only implies that the set of indices exist. Since our simulator must know these indices, our simulator is therefore inefficient. In general, an inefficient simulator seems inherent in the standard model, since the adversary's state could be scrambled in a way that hides which ciphertexts it is storing.

We proceed to show that various constructions from prior work are also secure in the multi-user setting, when plugging in somewhere randomness extractors. In all cases, the proof is essentially identical to the original single-user counterpart, except that the crucial step involving extraction is replaced with the somewhere randomness extraction guarantee. We thus obtain a variety of parameter size/security assumption trade-offs, essentially matching what is known for the single-user setting.

One small issue that comes up is that, once we have invoked the somewhere randomness extractor, the simulation is inefficient. This presents a problem in some of the security proofs, specifically in the "rate-1" setting where messages can be almost as large as ciphertexts. In the existing proofs in this setting, there is a computational hybrid step that comes after applying the extractor. Naively, this hybrid step would seem to be invalid since the reduction now has to be inefficient. We show, however, that the reduction can be made efficient as long as it is non-uniform, essentially having the choice of indices (and maybe some other quantities) provided as non-uniform advice. As long as the underlying primitive for these post-extraction hybrids has non-uniform security, the security proof follows.

Multiple ciphertexts per user. We also consider the setting where there may be multiple ciphertexts per user, which has not been considered previously.

It is not hard to see that having an unbounded number of ciphertexts per user is impossible in the standard model. This is because the simulator has to simulate everything but the secret key without knowing the message. Then, for the ciphertexts stored by the adversary, the simulator queries for the underlying messages and must generate the secret key so that those ciphertexts decrypt to the given messages. By incompressibility, this means the secret key length must be at least as large as the number of messages.

We instead consider the case of bounded ciphertexts per user. For a stateful encryption scheme, it is trivial to upgrade a scheme supporting one ciphertext per user into one supporting many: simply have the secret key be a list of one-time secret keys. In the symmetric key setting, this can be made stateless by utilizing k-wise independent hash functions.

In the public key setting, achieving a stateless construction requires more work, and we do not believe there is a simple generic construction. We show instead how to modify all the existing constructions to achieve multiple ciphertexts per user. Along the way, we show an interesting combinatorial approach to generically lifting non-committing encryption to the many-time setting without sacrificing ciphertext rate.

Random Oracle Model. In Supplementary Material D, we finally turn to constructions in the random oracle model. We give a construction of symmetric key incompressible encryption with optimal key and ciphertext length, achieving security for an unbounded number of users and unbounded number of ciphertexts per user. As explained above, this is only possible because our simulator utilizes the random oracle: the incompressibility argument no longer applies since the simulator can covertly set the messages by programming random oracle queries. The construction is essentially a 2-round unbalanced Feistel network.

We also show that standard hybrid encryption lifts essentially any random oracle-based symmetric key incompressible encryption to a public key scheme, assuming only general public key encryption. This significantly generalizes a construction of prior work. Note, however, that as observed by prior work, the security of the scheme in the standard model is problematic: they show that if the PKE scheme is instantiated with fully homomorphic encryption, then there is a simple efficient attack that completely violates incompressible security. This gives a very natural random oracle uninstantiability result. In particular, all prior random oracle uninstantiabilities require a contrived instantiation of some building block, whereas this uninstantiability only requires instantiating hybrid encryption with fully homomorphic encryption. (For example, even the "natural" uninstnatiability of Fiat-Shamir requires a contrived proof system.)

Remark 2. Note that the underlying symmetric key scheme in prior work uses ideal ciphers instead of random oracles. Thus, their uninstantiability is only for the ideal cipher model. Prior work claims the counterexample applies to random oracles, since random oracles and ideal ciphers are supposedly equivalent. However, this is incorrect, as the equivalence only holds in the "single stage" setting. Importantly, incompressible encryption is not a single stage game, owing to the space bound on the adversary's storage between receiving the ciphertexts and receiving the secret keys. In the more general multi-stage setting encompassing incompressible encryption, the equivalence of ideal ciphers and random oracles is open. Our generalized construction fixes this issue by directly designing our symmetric key scheme from random oracles.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a computerized method for message encryption in a multi-user setting includes receiving a message of arbitrary length for each of multiple users and storing the message on a computerized data store. The method further includes storing a predetermined target ciphertext length and executing a setup. The setup includes instantiating a functional encryption scheme to generate a master secret and public keys, generating a random variable, defining a function based on the random variable, and deriving a second secret by executing a function of the functional encryption scheme based on the function and the master secret, resulting in a derived secret. The method also includes encrypting the message by generating a first random string having a length based on the predetermined target ciphertext length, generating an at least partially random second string, encrypting the second string under the functional encryption scheme using the master public to generate a ciphertext, deriving a third string from the first random string, the second string, and the message, and outputting the third string, the first random string, and the ciphertext and storing the ciphertext in the computerized data store.

According to other aspects of the present disclosure, the method may include processing a derived secret and a ciphertext by a functional encryption decryption algorithm to derive a string, and deriving a plaintext message from the string, the first random string, and the third string. The plaintext message was previously encrypted by generating a first random string having a length based on a specified target ciphertext length, generating an at least partially random second string, encrypting the second string under a functional encryption scheme to generate a ciphertext, and deriving a third string from the first random string, the second string, and the message, and outputting the third string, the first random string, and the ciphertext.

According to another aspect of the present disclosure, a computerized system for message encryption in a multi-user setting includes a computerized processor configured for executing instructions for each of multiple users. The instructions include receiving a message of arbitrary length and storing the message on a computerized data store, storing a predetermined target ciphertext length, executing a setup, encrypting the message, and outputting a third string, a first random string, and a ciphertext and storing the ciphertext in the computerized data store.

According to other aspects of the present disclosure, the system may include a computerized processor configured for executing instructions for each sender-receiver pair. The instructions include processing a derived secret and a ciphertext by a functional encryption decryption algorithm to derive a string, and deriving a plaintext message from the string, the first random string, and the third string. The plaintext message was previously encrypted by generating a first random string having a length based on a specified target ciphertext length, generating an at least partially random second string, encrypting the second string under a functional encryption scheme to generate a ciphertext, and deriving a third string from the first random string, the second string, and the message, and outputting the third string, the first random string, and the ciphertext.

The foregoing general description of the illustrative embodiments and the following detailed description thereof are merely exemplary aspects of the teachings of this disclosure and are not restrictive.

BRIEF DESCRIPTION OF THE DRAWINGS

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

In the realm of digital communication, the security and privacy of transmitted data are of paramount concern. The present disclosure pertains to cryptographic systems, specifically focusing on a novel approach known as incompressible cryptography. This approach is designed to enhance the security of digital communications by making it challenging for unauthorized parties to store or process intercepted communications efficiently. Incompressible cryptography achieves this by generating ciphertexts that are deliberately large, making it resource-intensive for an adversary to store or analyze intercepted data.

In some aspects, the present disclosure provides methods and systems for message encryption in a multi-user setting. These methods and systems may involve receiving a message of arbitrary length from multiple users, storing the message in a computerized data store, and encrypting the message based on a predetermined target ciphertext length. The encryption process may involve generating a first random string of a length based on the predetermined target ciphertext length, generating an at least partially random second string, and encrypting the second string under a functional encryption scheme to generate a ciphertext. The encrypted message is then outputted and stored in the computerized data store.

In other aspects, the present disclosure provides methods and systems for decrypting an encrypted message. These methods and systems may involve processing a derived secret key and a ciphertext by a functional encryption decryption algorithm to derive a string, and deriving a plaintext message from the derived string. The plaintext message, which was previously encrypted, can then be outputted.

These methods and systems for message encryption and decryption may offer enhanced security against unauthorized access and mass surveillance. By leveraging the principles of incompressibility, these methods and systems may provide strong long-term security guarantees, ensuring the privacy and integrity of digital communications in an increasingly surveilled world.

Figure 1:
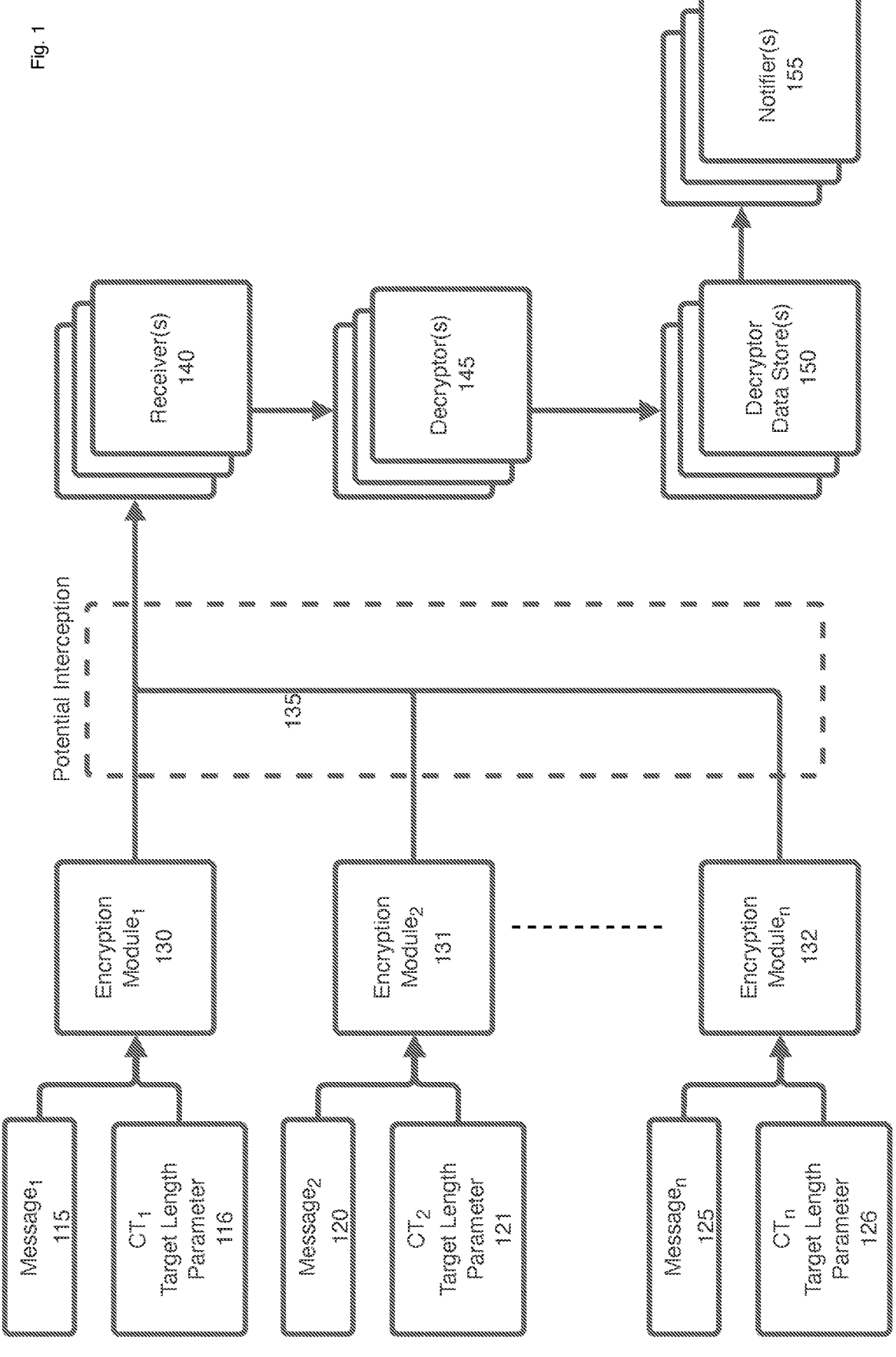
FIG. 1 illustrates a system for transmitting and receiving encrypted messages over a network, according to aspects of the present disclosure.

Referring to FIG. 1, an example system for transmitting and receiving encrypted messages over a network is illustrated. In some aspects, the system may support multiple users, each originating multiple encrypted messages. The original data or other forms of information can be stored in a transmitter side data store for multiple users, illustrated as First Message 115, Second Message 120, up to an arbitrarily large number of messages, including a Nth Message 125. Each of these messages, 115, 120, 125, can be associated with a respective target length parameter, such as First Message Target Length Parameter 116, Second Message Target Length Parameter 121, and Nth Message Target Length Parameter 126.

In some cases, respective encryption modules, such as First Encryption Module 130, Second Encryption Module 131, and Nth Encryption Module 132, can be configured to encrypt their input messages based on the respective predetermined target length parameters 116, 121, 126. This configuration ensures that the output ciphertext is expanded to have the predetermined target length. The messages can be encoded or encrypted using these encoders 130, 131, 132, according to the data expansion constructions described herein. The expanded messages can then be transmitted by a transmitter or multiple respective transmitters over a Communication Channel 135 to Receivers 140.

After being received at Receivers 140, the messages are decrypted using Decryptors 145 according to the constructions described herein, and stored in Decryptor Data Stores 150. The decryptor can be configured in such a way that the output of the decryptor is limited to be one of the original message, a completely unrelated message, or no message at all, such as a failure state. The output of the decryptor(s) is then input to Notifiers 155 which can be configured to provide the output of decryptor to an operator, such as an individual or a further system configured to operate on the output.

In some embodiments, the system may be implemented as-a-service, within or in association with a cloud deployment platform system or appliance, or using any other type of deployment systems, products, devices, programs or processes. The system may also interact or interoperate with security analytics systems or services. In other cases, the system may be implemented in or in conjunction with various server-side architectures including simple n-tier architectures, web portals, federated systems, and the like. The system may take the form of an entirely hardware embodiment, an entirely software embodiment or an embodiment containing both hardware and software elements. The system may also be implemented as a management solution, service, product, appliance, device, process, program, execution thread, or the like. The system may be implemented in a special purpose computing platform, in software executed by one or more processors. The system may be implemented in a personal digital assistant (PDA), desktop workstation, laptop or notebook computer, netbook, tablet, smartphone, smartwatch or other wearable devices, appliance, part of the Internet-of-Things, and/or embedded system. The system may be implemented as a client or server computing device, accessing or hosting any applications and/or data through any delivery paradigm. The system may be implemented in a standalone approach, e.g., one or more software-based functions executed by one or more hardware processors, or it may be available as a managed service (including as a web service via a SOAP/XML interface).

Figure 2:
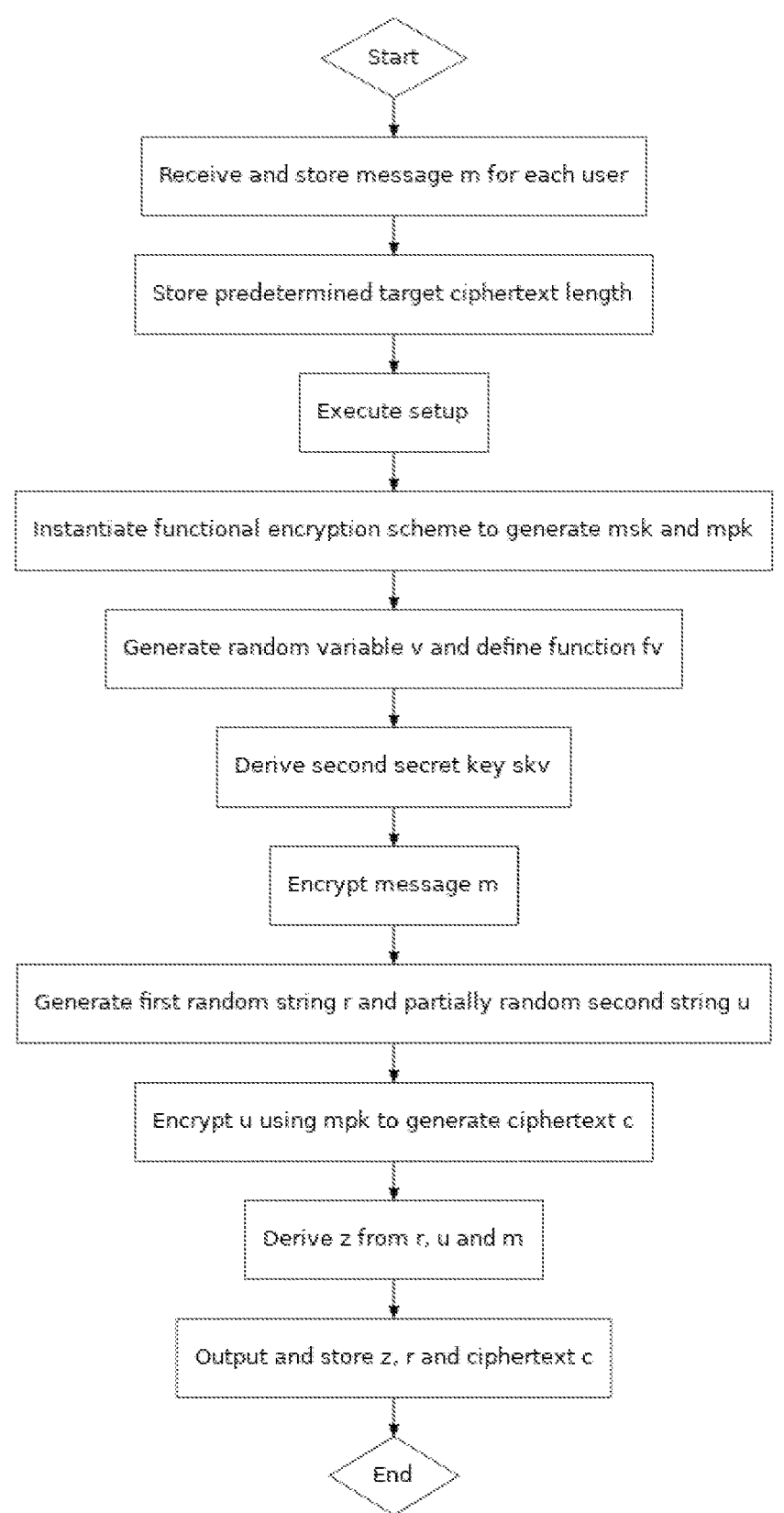
FIG. 2 presents a flowchart detailing a method for message encryption in a multi-user setting, according to aspects of the present disclosure.

Referring to FIG. 2, a flowchart illustrating a method for message encryption in a multi-user setting is depicted. In some aspects, the method begins with receiving and storing a message m for each user. The message m may be of arbitrary length and can be stored on a computerized data store. The method may also involve storing a predetermined target ciphertext length. This target length may be determined based on various factors, such as the desired level of security, the capacity of the communication channel, or the storage capabilities of the users.

In some cases, the method includes executing a setup process. This setup process may involve instantiating a functional encryption scheme to generate a master secret key msk and a master public key mpk. The functional encryption scheme may be any suitable encryption scheme that allows for the encryption of data in such a way that the decryption keys can be associated with functions, enabling selective access to the encrypted data. The master secret and public keys may be generated using any suitable cryptographic algorithms.

The setup process may also involve generating a random variable v. This random variable v may be generated using any suitable random number generator. The method may further involve defining a function fv based on the random variable v. The function fv may be any suitable function that can be used in the context of functional encryption.

In some embodiments, the setup process includes deriving a second secret key skv. This second secret key skv may be derived by executing a key generation algorithm of the functional encryption scheme based on the function fv and the master secret key msk. The derived secret keys skv may be used in the encryption and decryption processes.

The method may further involve encrypting the message m. This encryption process may involve generating a first random string r and a partially random second string u. The first random string r may have a length based on the predetermined target ciphertext length. The second string u may be at least partially random, meaning that some parts of the string may be random while other parts may be determined based on specific criteria or rules.

In some cases, the method involves encrypting the second string u under the functional encryption scheme using the master public key mpk to generate a ciphertext c. The ciphertext c may be the encrypted version of the message m and may be used for secure transmission over a network.

Finally, the method may involve deriving a value z from the first random string r, the second string u, and the message m. The derived value z, the first random string r, and the ciphertext c may then be outputted and stored in the computerized data store, concluding the encryption process. The stored data may be used for subsequent decryption or for other purposes, such as auditing or analysis.

Figure 3:
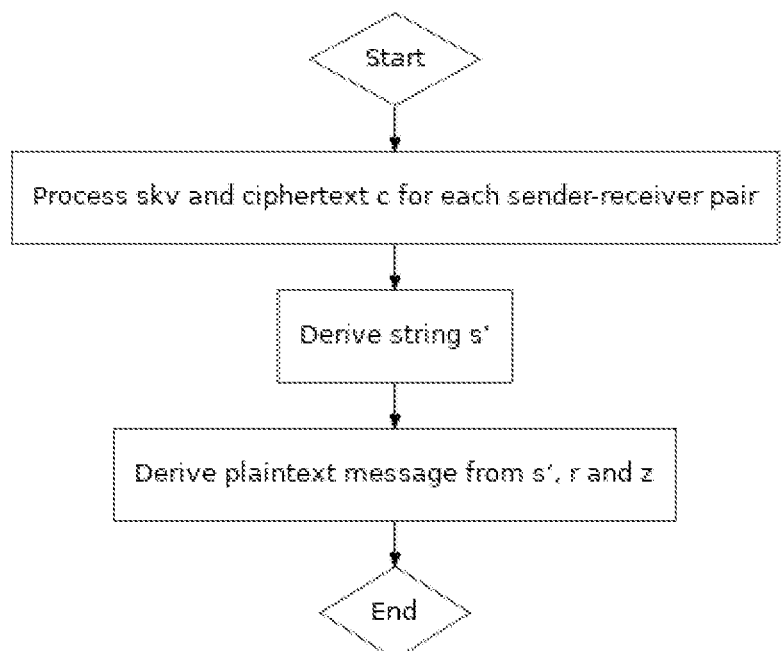
FIG. 3 depicts a flowchart of a method for decrypting an encrypted message, according to aspects of the present disclosure.

Referring to FIG. 3, a flowchart of a method for decrypting an encrypted message is depicted. In some aspects, the decryption process begins with a "Start" node, indicating the initiation of the decryption process. The process may then proceed to a step where a derived secret key skv and a ciphertext c are processed for each sender-receiver pair. This processing step may involve applying a functional encryption decryption algorithm to the derived secret keys skv and the ciphertexts c. The functional encryption decryption algorithm may be any suitable algorithm that can decrypt data encrypted using a functional encryption scheme.

In some cases, the decryption process involves deriving a string s' from the processing step. The derived string s' may be a result of the decryption process and may contain information that can be used to recover the original plaintext message. The method for deriving the string s' may depend on the specific functional encryption decryption algorithm used.

Subsequently, the decryption process may involve deriving the plaintext message from the derived string s', a first random string r, and a derived value z. The plaintext message may be the original message that was encrypted. The method for deriving the plaintext message may involve combining or processing the derived string s', the first random string r, and the derived value z in a specific manner. The specific method for deriving the plaintext message may depend on the encryption process that was used to encrypt the original message.

The flowchart concludes with an "End" node, indicating the completion of the decryption process. Once the decryption process is completed, the plaintext message may be outputted or stored for further use. In some cases, the decrypted plaintext message may be used for various purposes, such as data analysis, auditing, or communication.

Figure 4:
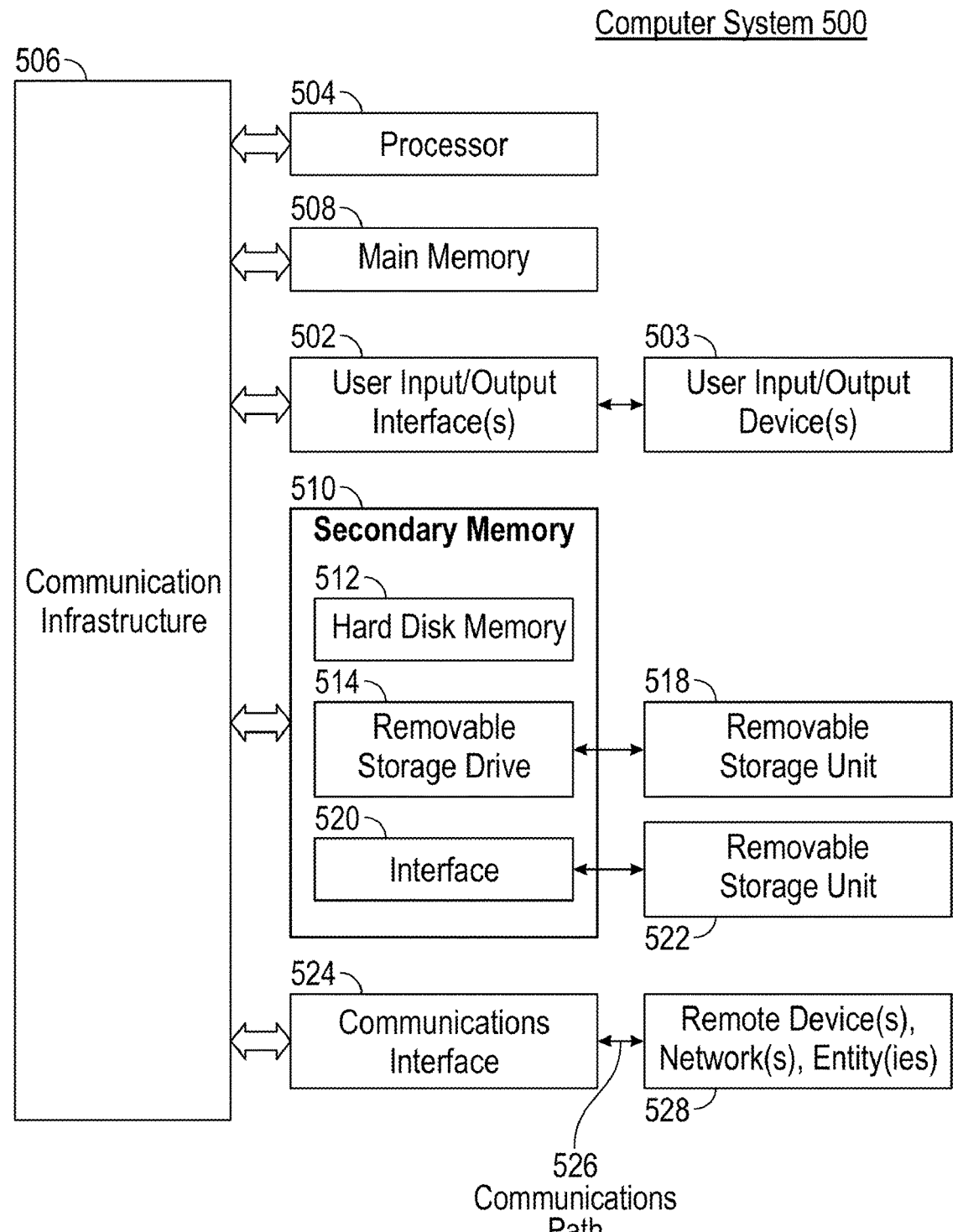
FIG. 4 shows a block diagram of a computer system, highlighting its various components and their interconnections, according to aspects of the present disclosure.

Referring to FIG. 4, a block diagram of a computer system 500 is depicted. In some aspects, the computer system 500 may be a client or server computing device, accessing or hosting any applications and/or data through any delivery paradigm. The computer system 500 may be implemented in a personal digital assistant (PDA), desktop workstation, laptop or notebook computer, netbook, tablet, smartphone, smartwatch or other wearable devices, appliance, part of the Internet-of-Things, and/or embedded system.

In some cases, the computer system 500 includes a processor 504 that is connected to a communication infrastructure 506. The communication infrastructure 506 may be any suitable communication medium or link that allows for data transfer between different components of the computer system 500. The processor 504 may be a central processing unit, a microprocessor, or any other suitable processing device capable of executing instructions.

The computer system 500 may also include user input/output interfaces 502 that connect the processor 504 to user input/output devices 503. The user input/output devices 503 may include monitors, keyboards, pointing devices, or any other devices that allow for user interaction with the computer system 500.

In some embodiments, the computer system 500 includes a main memory 508 and a secondary memory 510. The main memory 508 may be a random-access memory (RAM) or any other suitable type of memory for storing data and instructions. The secondary memory 510 may include a hard disk memory 512 and a removable storage drive 514. The removable storage drive 514 may interface with a removable storage unit 518 through an interface 520. The removable storage unit 518 may be any suitable type of storage device that can be removed from the computer system 500, such as a removable hard drive, a flash drive, or a memory card.

The computer system 500 may further include a communications interface 524 that is connected to the communication infrastructure 506. The communications interface 524 may facilitate communication with remote devices, networks, entities 528 via a communications path 526. The communications path 526 may be a wired or wireless communication link, such as a local area network (LAN), a wide area network (WAN), the Internet, or any other suitable communication link.

In some cases, the computer system 500 may include an unknown element 522. The function or connection of the unknown element 522 within the diagram is not clearly defined. However, in some embodiments, the unknown element 522 may be a component or module that provides additional functionality to the computer system 500.

Figure 5:
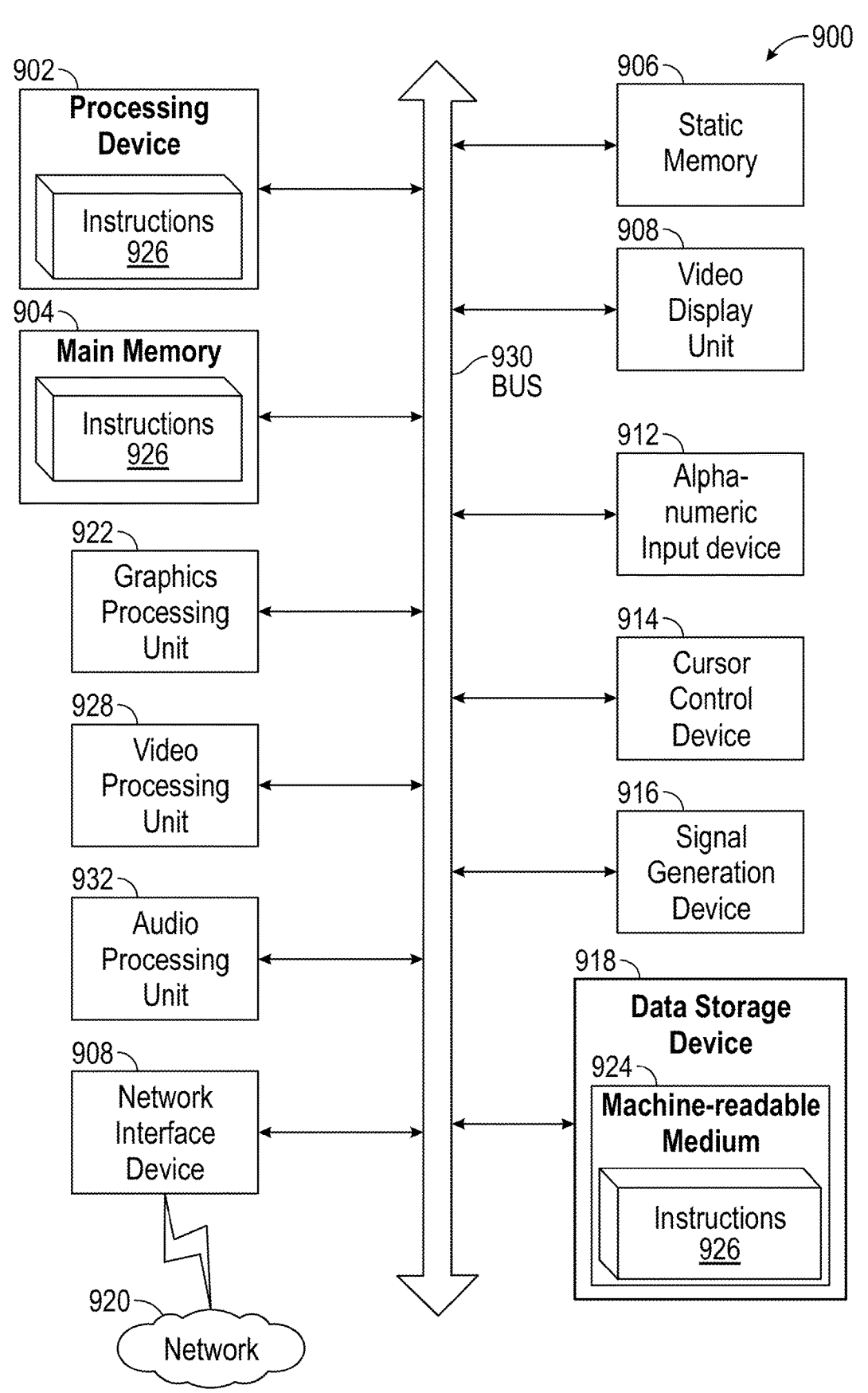
FIG. 5 provides a block diagram of another computer system, detailing its components and their interconnections, according to aspects of the present disclosure.

Referring to FIG. 5, a block diagram of a Computer System 900 is depicted. In some aspects, the Computer System 900 may be a client or server computing device, accessing or hosting any applications and/or data through any delivery paradigm. The Computer System 900 may be implemented in a personal digital assistant (PDA), desktop workstation, laptop or notebook computer, netbook, tablet, smartphone, smartwatch or other wearable devices, appliance, part of the Internet-of-Things, and/or embedded system.

In some cases, the Computer System 900 includes a Processing Device 902 that is connected to a Communication Bus 930. The Communication Bus 930 may be any suitable communication medium or link that allows for data transfer between different components of the Computer System 900. The Processing Device 902 may be a central processing unit, a microprocessor, or any other suitable processing device capable of executing Executable Instructions 926.

The Computer System 900 may also include a Main Memory 904 and a Static Memory 906 that are connected to the Communication Bus 930. The Main Memory 904 may be a random-access memory (RAM) or any other suitable type of memory for storing data and instructions. The Static Memory 906 may be a flash memory, static random-access memory (SRAM), or any other suitable type of memory that retains stored data even when not powered.

In some embodiments, the Computer System 900 includes a Network Interface Device 908 that is connected to the Communication Bus 930. The Network Interface Device 908 may facilitate communication with an External Network 920. The External Network 920 may be a wired or wireless communication link, such as a local area network (LAN), a wide area network (WAN), the Internet, or any other suitable communication link.

The Computer System 900 may further include an Alphanumeric Input Device 912 and a Cursor Control Device 914 that allow user interaction with the Computer System 900. The Alphanumeric Input Device 912 may be a keyboard, touchscreen, or any other suitable device that allows for alphanumeric input. The Cursor Control Device 914 may be a mouse, trackpad, or any other suitable device that allows for cursor control.

In some cases, the Computer System 900 includes a Signal Generation Device 916 that is capable of producing output signals. The Signal Generation Device 916 may be a speaker, display, or any other suitable device that can generate output signals based on the data processed by the Computer System 900.

The Computer System 900 may also include a Data Storage Device 918 that is connected to the Communication Bus 930. The Data Storage Device 918 may include a Machine-readable Medium 924 that stores the Executable Instructions 926. The Machine-readable Medium 924 may be any suitable type of storage medium that can store data in a form readable by a machine, such as a computer. The Executable Instructions 926 may be any set of instructions that, when executed by the Processing Device 902, cause the Computer System 900 to perform a specific operation or series of operations.

In some embodiments, the Computer System 900 includes a Graphics Processing Unit 922 and a Video Processing Unit 928 that are connected to the Communication Bus 930. The Graphics Processing Unit 922 may be a specialized electronic circuit designed to process mathematically intensive applications, such as computer graphics applications, images, videos, etc. The Video Processing Unit 928 may be a specialized electronic circuit designed to process video data. The Computer System 900 may also include an Audio Processing Unit 932 for processing audio data.

2 Preliminaries

Notation-wise, for $n \in \mathbb{N}$, we let [n] denote the ordered set $\{1, 2, \ldots, n\}$. We use capital bold letters to denote a matrix M. Lowercase bold letters denote vectors v. Let $M_{i,j}$ denote the element on the i-th row, and j-th column of M, and $v_i$ denote the i-th element of v.

Lemma 1 (Johnson Bound). Let $\mathcal{C} \subseteq \Sigma^n$ with $|\Sigma|=q$ be any q-ary error-correcting code with relative distance $$p_0 = 1 - (1+\rho)\frac{1}{q} \text{ for } \rho > 0,$$

meaning that for any two distinct values x, $y \in \mathcal{C}$, the Hamming distance between x, y is at least $p_0 \cdot n$. Then for any $\delta > \sqrt{\rho(q-1)}$ there exists some $$L \leq \frac{(q-1)^2}{\delta^2 - \rho(q-1)}$$

such that the code is $$\left(p_1 = \left(1 - (1+\delta)\frac{1}{q}\right), L\right) - \text{list decodable},$$

meaning that for any $$y \in \sum_q^n$$

there exist at most L codewords $x \in \mathcal{C}$ that are within Hamming distance $p_1 n$ of y.

Lemma 2 (Distinguishing implies Predicting). For any randomized function D: $\{0, 1\}^n \times \{0, 1\}^m \to \{0, 1\}$ there exists some randomized function P: $\{0, 1\}^n \to \{0, 1\}^m$ such that for any jointly distributed random variables (A, B) over $\{0, 1\}^n \times \{0, 1\}^m$: if $\Pr[D(A, B)=1] - \Pr[D(A, U_b)=1] \geq \varepsilon$ then $$Pr[P(A) = B] \geq \frac{1}{2^m}(1 + \varepsilon).$$

Min-Entropy Extractor. Recall the definition for average min-entropy:

Definition 1 (Average Min-Entropy). For two jointly distributed random variables (X, Y), the average min-entropy of X conditioned on Y is defined as $$H_\infty(X \mid Y) = -\log E_{y \leftarrow Y}\left[\max_x Pr[X = x \mid Y = y]\right].$$

Lemma 3. For random variables X, Y where Y is supported over a set of size T, we have $H_\infty(X|Y) \geq H_\infty(X, Y) - \log T \geq H_\infty(X) - \log T$.

Definition 2 (Extractor). A function Extract: $\{0, 1\}^n \times \{0, 1\}^d \to \{0, 1\}^m$ is a (k, $\epsilon$) strong average min-entropy extractor if, for all jointly distributed random variables (X, Y) where X takes values in $\{0, 1\}^n$ and $H_\infty(X|Y) \geq k$, we have that $(U_d$, Extract(X; $U_d$), Y) is $\epsilon$-close to (s, $U_m$, Y), where $U_d$ and $U_m$ are uniformly random strings of length d and m respectively.

Remark 3. Any strong randomness extractor is also a strong average min-entropy extractor, with a constant loss in $\epsilon$.

Definitions of incompressible encryption and functional are provided herein.

3 Somewhere Randomness Extraction 3.1 Defining Somewhere Extraction

Definition 3 (Somewhere Randomness Extraction). A function Ext: $\{0, 1\}^n \times \{0, 1\}^d \to \{0, 1\}^m$ is (t, $\alpha$, $\beta$, $\varepsilon$)-somewhere extracting if the following holds. Let $X=(X_1, \ldots, X_t)$ be any random variable consisting of blocks $X_i \in \{0, 1\}^n$ such that $H_\infty(X) \geq \alpha \cdot tn$. Then, there exists some random variable $I_X$ jointly distributed with X, such that $I_X$ is supported over sets $\mathcal{I} \subseteq [t]$ of size $|\mathcal{I}| \geq \beta \cdot t$ and:

$$(S_1, \ldots, S_t, Ext(X_1; S_1), \ldots, Ext(X_t; S_t)) \approx_\varepsilon (S_1, \ldots, S_t, Z_1, \ldots, Z_t)$$

where $S_i \in \{0, 1\}^d$ are uniformly random and independent seeds, and $Z_i \in \{0, 1\}^m$ is sampled uniformly random for $i \in I_X$ while $Z_i =$ $$Ext(X_i; S_i) \text{ for } i \notin I_X.$$

In other words, the above definition says that if we use a "somewhere extracting" extractor with independent seeds to individually extract from t correlated blocks that have a joint entropy-rate of $\alpha$, then seeing all the extracted outputs is indistinguishable from replacing some carefully chosen $\beta$-fraction of them by uniform.

3.2 Hinting Extractors

Definition 4 (Hinting Extractor). A function Ext: $\{0, 1\}^n \times \{0, 1\}^d \to \{0,1\}^m$ is a ($\delta$, L, h, Q)-hinting extractor if it satisfies the following:

List Decodable: If we think of $ECC(x)=(Ext(x; s))_{s \in \{0,1\}^d}$ as a $(2^d, n)_{\Sigma=\{0,1\}m}$ error-correcting code over the alphabet $\Sigma=\{0,1\}^m$, then the code is $(p=1-(1+\beta)2^{-m}, L)$-list decodable, meaning that for any $y \in \Sigma^{2^d}$, the number of codewords that are within Hamming distance $p \cdot 2^d$ of y is at most L.

Pairwise-Independent Hint: There exists some functions hint: $\{0, 1\}^n \times \{0,1\}^\tau \to \{0, 1\}^h$, along with $rec_0$ and $rec_1$ such that:

For all $x \in \{0, 1\}^n$, $r \in \{0, 1\}^\tau$, if we define $\sigma=hint(x; r)$, $\{s_1, \ldots, s_Q\}=rec_0(r)$, and $\{y_1, \ldots, y_Q\}=rec_1(\sigma, r)$, then $Ext(x; s_i)=y_i$ for all $i \in [Q]$.

Over a uniformly random $r \leftarrow \{0,1\}^\tau$, the Q seeds $\{s_1, \ldots, s_Q\}=rec_0(r)$, are individually uniform over $\{0, 1\}^d$ and pairwise independent.

Intuitively, the pairwise-independent hint property says that there is a small (size h) hint about x that allows us to compute $Ext(x; s_i)$ for a large (size Q) set of pairwise independent seeds $s_i$. We generally want Q to be exponential in h.

The list-decoding property, on the other hand, is closely related to the standard definition of strong randomness extractors. Namely, if Ext is a (k, $\epsilon$)-extractor then it is also $(p=1-(1+\delta)2^{-m}, 2^k)$-list decodable for $\delta=\epsilon \cdot 2^m$, and conversely, if it is $(p=1-(1+\delta)2^{-m}, 2^k)$-list decodable then it is a $(k+m+\log(1/\delta), \delta)$-extractor.

Construction 1: Hadamard. Define Ext: $\{0, 1\}^n \times \{0, 1\}^n \to \{0, 1\}^m$ via $Ext(x; s)=\langle x, s \rangle$, where we interpret x, s as elements of $$\mathbb{F}_{2^m}^{\bar{n}}$$

for n: $=n/m$ and all the operations are over $\mathbb{F}_{2^m}$. The seed length is d=n bits and the output length is m bits.

Lemma 4. The above Ext: $\{0, 1\}^n \times \{0, 1\}^n \to \{0, 1\}^m$ is a ($\delta$, L, h, Q)-hinting extractor for any h,$\delta > 0$ with $Q \geq 2^{h-m}$ and $L \leq 2^{2m}/\delta^2$.

Construction 2: Hadamard o Reed-Muller. Define Ext(f; s=(s_1, s_2))=⟨ f(s_1), s_2⟩ , where $$f \in \mathbb{F}_{2^w}^{\binom{\ell+g}{g}}$$

is interpreted as a l-variate polynomial of total degree g over some field of size $2^w > g$, and $$s_1 \in \mathbb{F}_{2^w}^{\ell}$$

is interpreted as an input to the polynomial (this is Reed-Muler). Since the input to the extractor is interpreted as a polynomial, we will denote it by f rather than the usual x to simplify notation. Then $y=f(s_1)$ and $s_2$ are interpreted as a values in $$\mathbb{F}_{2^m}^{w/m}$$

and the inner-product ⟨ y, s_2⟩ is computed over $\mathbb{F}_{2^m}$ (this is Hadamard). So overall, in bits, the input length is $$n = w \cdot \binom{\ell+g}{g},$$

the seed length is d=w(l+1) and the output length is m. This code has relative distance $$1 - \left(\frac{1}{2^m} + \frac{g}{2^w}\right) = 1 - \frac{1}{2^m}\left(1 + \frac{g}{2^{w-m}}\right).$$

Lemma 5. For any w, l, g, m, δ such that $2^w > g$ and m divides w, if we set $$n = w \cdot \binom{\ell+g}{g}.$$

d=w(l+1) then the above Ext: $\{0, 1\}^n \times \{0, 1\}^d \rightarrow \{0, 1\}^m$ is a (δ, L, h, Q)-hinting extractor with $\delta = \sqrt{g2^{2m}/2^w}$, $$L = \frac{2^{2m}}{\delta^2 - g2^{2m}/2^w},$$

h=w·(g+1), Q=2^w.

In particular, for any n, m, w such that m divides w, we can set l=g=log n to get an (δ, L, h, Q)-hinting extractor Ext: $\{0, 1\}^n \times \{0, 1\}^d \rightarrow \{0, 1\}^m$ with d=O(w log n), $\delta = 2^{m+\log \log n - w/2}$, h=O(w log n) and Q=2^w.

3.3 Hinting-Extractors are Somewhere-Extracting

Lemma 6 (Somewhere-Extraction Lemma). Let Ext: $\{0, 1\}^n \times \{0, 1\}^d \rightarrow \{0,1\}^m$ be a (δ, L, h, Q)-hinting extractor. Then, for any t, α>0 such that $$Q \geq 2t\frac{2^{2m}}{\delta^2},$$

it is also (t, α, β, ε)-somewhere extracting with $$\varepsilon = 6t\delta \text{ and } \beta = \alpha - \frac{\log L + h + \log t + \log(1/\varepsilon) + 3}{n}.$$

Corollary 1. For any n, m, t, ε>0, α>0, there exist extractors Ext $\{0, 1\}^n \times \{0, 1\}^d \rightarrow \{0, 1\}^m$ that are (t, α, β, ε)-somewhere extracting with either:

1. seed length d=n and $$\beta = \alpha - \frac{O(m + \log t + \log(1/\varepsilon))}{n},$$

or 2. seed length d=O((log n)(m+log log n+log t+log(1/ε))) and $$\beta = \alpha - \frac{O(d)}{n}.$$

4 Multi-User Security for Incompressible Encryption

Utilizing somewhere randomness extractors, we can now explore the multi-user setting for incompressible encryptions. But first, we need to formally define what it means for an incompressible PKE or SKE scheme to be multi-user secure.

We propose a simulation-based security definition. Roughly, the simulator first needs to simulate all the ciphertexts for all the instances without seeing any of the message queries. So far, this is akin to the standard semantic security notion for encryption. But we need to now model the fact that the adversary can store ciphertexts for later decryption, at which point it has all the private keys. We therefore add a second phase where the simulator can query for a subset of the messages, and then must simulate all the private keys. We require that no space-bounded distinguisher can distinguish between receiving real encryptions/real private keys vs receiving simulated encryptions/keys. The number of messages the simulator can query is related to the storage bound of the distinguisher.

Put formally, let Π=(Gen, Enc, Dec) be a public key encryption scheme, to define simulation-based incompressible ciphertext security for the multiple-instance setting, consider the following two experiments:

In the real mode experiment, the adversary $\mathcal{A} = (\mathcal{A}_1, \mathcal{A}_2)$ interacts with the challenger $\mathcal{C}$, who has knowledge of all the adversary's challenge messages.

Real Mode $$ExpReal_{C,\mathcal{A}=(\mathcal{A}_1,\mathcal{A}_2)}^{\Pi}(\lambda, \eta, \ell, S):$$

1. For i∈[η], the challenger $\mathcal{C}$ runs Gen($1^\lambda$, $1^S$) to sample (pk_i, sk_i).
2. The challenger $\mathcal{C}$ sends all the pk_i's to $\mathcal{A}_1$.
3. For each i∈[η], $\mathcal{A}_1$ can produce up to l message queries $\{m_{i,j}\}_{j \in |l|}$. The adversary submits all of the message queries in one single batch $\{m_{i,j}\}_{i,j}$ and receives $\{ct_{i,j}\}_{i,j}$ where $ct_{i,j} \leftarrow Enc(pk_i, m_{i,j})$.

4. $\mathcal{A}_1$ produces a state st of size at most S.

5. On input of st, $\{m_{i,j}\}_{i,j}$, $\{(pk_i, sk_i)\}_i$, $\mathcal{A}_2$ outputs a bit 1/0.

In the ideal mode experiment, the adversary $\mathcal{A} = (\mathcal{A}_1, \mathcal{A}_2)$ interacts with a simulator S, which needs to simulate the view of the adversary with no/partial knowledge of the challenge messages.

Ideal Mode $$ExpIdeal_{S,\mathcal{A}=(\mathcal{A}_1,\mathcal{A}_2)}^{\Pi}(\lambda, \eta, \ell, q, S):$$

1. For $i \in [\eta]$, the simulator S samples $pk_i$.

2. The simulator S sends all the $pk_i$'s to $\mathcal{A}_1$.

3. For each $i \in [\eta]$, and $j \in [l]$, $\mathcal{A}_1$ produces $m_{i,j}$. All of the queries $\{m_{i,j}\}_{i,j}$, are sub-mitted in one batch and the simulator S produces $\{ct_{i,j}\}_{i,j}$ without seeing $\{m_{i,j}\}_{i,j}$.

4. $\mathcal{A}_1$ produces a state st of size at most S.

5. The simulator now submits up to q number of (i, j) index pairs, and receives the corresponding messages $m_{i,j}$'s. Then S simulates all the secret keys $sk_i$'s.

6. On input of st, $\{m_{i,j}\}_{i,j}$, $\{(pk_i, sk_i)\}_i$, $\mathcal{A}_2$ outputs a bit 1/0.

Notice that the simulator needs to simulate the ciphertexts first without knowing the corresponding messages, and then sample the secret keys so that the ciphertexts appear appropriate under the given messages.

Definition 5 (Multi-Instance Simulation-Based CPA Security).

For security parameters $\lambda$, $\eta(\lambda)$, $l(\lambda)$, $q(\lambda)$ and $S(\lambda)$, a public key encryption scheme $\Pi = (Gen, Enc, Dec)$ is $(\eta, l, q, S)$-MULT-SIM-CPA secure if for all PPT adversaries $\mathcal{A} = (\mathcal{A}_1, \mathcal{A}_2)$, there exists a simulator S such that:

$$\left| Pr\left[ ExpReal_{C,\mathcal{A}}^{\Pi}(\lambda, \eta, \ell, S) = 1 \right] - Pr\left[ ExpIdeal_{S,\mathcal{A}}^{\Pi}(\lambda, \eta, \ell, q, S) = 1 \right] \right| \le$$

$$negl(\lambda).$$

Remark 4. If l=1, we say that the scheme has only single-ciphertext-per-user security. For l>1, we say that the scheme has multi-ciphertext-per-user security.

Remark 5. Notice that by replacing the underlying PKE scheme with a Symmetric Key Encryption (SKE) scheme and modifying corresponding syntaxes (sample only sk's instead of (pk, sk) pairs, and remove step 2 of the experiments where the adversary receives the pk's), we can also get a MULT-SIM-CPA security definition for SKE schemes.

5 Symmetric Key Incompressible Encryption

In this section, we explore the multi-user security of incompressible SKEs, both in the low-rate setting and the rate-1 setting. We also present a generic lifting technique to obtain an SKE with multi-ciphertext-per-user security from an SKE with single-ciphertext-per-user security.

5.1 Low Rate Incompressible SKE

For low rate incompressible SKE, it follows almost immediately from somewhere randomness extractors that the forward-secure storage by prior work is MULT-SIM-CPA secure (by using somewhere randomness extractors as the "BSM function" and using One Time Pad (OTP) as the underlying SKE primitive).

First, let us recall the construction by prior work, with the somewhere randomness extractors and OTP plugged in.

Construction 1 (Forward-Secure Storage). Let $\lambda$ and S be security parameters. Given Ext: $\{0,1\}^n \times \{0,1\}^d \to \{0, 1\}^w$ a $(t, \alpha, \beta, \epsilon)$-somewhere randomness extractor as defined in Definition 3 where the seed length d=poly($\lambda$), output length w=poly($\lambda$) and $$n = \frac{S}{(1-\alpha)t} + poly(\lambda),$$

the construction $\Pi = (Gen, Enc, Dec)$ for message space $\{0,1\}^w$ works as follows:

Gen($1^\lambda$, $1^S$): Sample a seed $s \leftarrow \{0,1\}^d$ for the randomness extractor, and a key $k' \leftarrow \{0, 1\}W$. Output k=(s, k').

Enc(k, m): To encrypt a message m, first parse k=(s, k') and sample a long randomness $R \leftarrow \{0, 1\}^n$. Compute the ciphertext as ct=(R, ct'=Ext(R; s)$\oplus$k'$\oplus$m).

Dec(k, ct): First, parse ct=(R, ct') and k=(s, k'). Then compute m=Ext(R; s)$\oplus$k'$\oplus$ct'.

Correctness is straightforward. Construction 1 is also MULT-SIM-CPA secure. Essentially, the simulator simply sends $ct_i$'s as uniformly random strings. Then when the simulator sends the keys, it would use the simulator for the somewhere randomness extractor to get the index subset $I \subset [\eta]$, and for $i \in I$, simply send $k_i$ as a uniformly random string. For $i \notin I$, it samples the extractor seed $s_i$ and then compute $k_i' = m_i \oplus Ext(R_i; s_i) \oplus ct_i'$. Notice that for $i \notin I$, $ct_i' = m_i \oplus Ext(R_i; s_i) \oplus k_i'$, and for $i \in I$, $ct_i' = m_i \oplus u_i \oplus k_i'$ where $u_i$ is a w-bit uniform string. This is now just the definition of somewhere randomness extractors.

Theorem 1. Let $\lambda$, S be security parameters. If Ext: $\{0, 1\}^n \times \{0, 1\}^d \to \{0, 1\}^w$ is a $(t, \alpha, \beta, \epsilon)$-somewhere randomness extractor with d, w=poly($\lambda$) and $$n = \frac{S}{(1-\alpha)t} + poly(\lambda),$$

then Construction 1 is $(t,1,(1-\beta)t, S)$-MULT-SIM-CPA secure.

Remark 6. While MULT-SIM-CPA security only requires that no PPT adversaries can distinguish between the real mode and the ideal mode experiments, what we have proved for construction 1 here is that it is actually MULT-SIM-CPA secure against all (potentially computationally unbounded) adversaries, and hence is information theoretically MULT-SIM-CPA secure.

5.2 Rate-1 Incompressible SKE

Prior constructs rate-1 incompressible SKE from HILL-Entropic Encodings, extractors and PRGs. We show that by replacing the extractors with somewhere randomness extractors and slightly modifying the scheme, we get MULT-SIM-CPA security.

First, we recall the definitions and security requirements of a HILL-Entropic Encoding scheme.

Definition 6 (HILL-Entropic Encoding). Let $\lambda$ be the security parameter. An $(\alpha, \beta)$-HILL-Entropic Encoding in the common random string setting is a pair of PPT algorithms Code=(Enc, Dec) that works as follows:

Enc$_{crs}$($1^\lambda$, m)$\to$c: On input the common random string crs, the security parameter, and a message, outputs a codeword c.

Dec$_{crs}$(c)$\to$m: On input the common random string and a codeword, outputs the decoded message m.

It satisfies the following properties.

Correctness. For all $\lambda \in \mathbb{N}$ and $m \in \{0, 1\}^*$, $\Pr[\text{Dec}_{crs}$ $(\text{Enc}_{crs}(1^\lambda, m))=m] \geq 1-\text{negl}(\lambda)$.

$\alpha$-Expansion. For all $\lambda$, $k \in \mathbb{N}$ and for all $m \in \{0, 1\}^k$, $|\text{Enc}_{crs}(1^\lambda, m)| \leq \alpha(\lambda, k)$.

$\beta$-HILL-Entropy. There exists a simulator algorithm SimEnc such that for all polynomial $k=k(\lambda)$ and any ensemble of messages $m=\{m_\lambda\}$ of length $k(\lambda)$, consider the following real mode experiment:

$\text{crs} \leftarrow \{0, 1\}^{r(\lambda,k)}$ $c \leftarrow \text{Enc}_{crs}(1^\lambda, m_\lambda)$ and let CRS, $\mathcal{A}$ denote the random variables for the corresponding values in the real mode experiment. Also consider the following simulated experiment:

$(\text{crs}', c') \leftarrow \text{SimEnc}(1^\lambda, m_\lambda)$ and let CRS', C'' be the corresponding random variables in the simulated experiment. We require that $(\text{CRS}, C) \approx_c (\text{CRS}', C'')$ and that $H_\infty(C'|\text{CRS}') \geq \beta(\lambda, k)$.

Prior work shows that we can construct HILL-Entropic Encodings in the CRS model from either the Decisional Composite Residuosity (DCR) assumption or the Learning with Errors (LWE) problem. Their construction achieves $\alpha(\lambda, k)=k(1+o(1))+\text{poly}(\lambda)$ and $\beta(\lambda, k)=k(1-o(1))-\text{poly}(\lambda)$, which we call a "good" HILL-entropic encoding.

Now we reproduce the construction from prior work with the somewhere randomness extractors and some other minor changes (highlighted below).

Construction 2. Let $\lambda$ and S be security parameters. Given Ext: $\{0,1\}^n \times \{0,1\}^d \rightarrow \{0, 1\}^w$ a $(t, \alpha, \beta, \epsilon)$-somewhere randomness extractor as defined in Definition 3 where the seed length $d=\text{poly}(\lambda)$, $w=\text{poly}(\lambda)$ and $$n = \frac{S}{(1-\alpha)t} + \text{poly}(\lambda),$$

Code=Enc, Dec) a "good" $(\alpha', \beta')$-HILL-Entropic Encoding scheme, and PRG: $\{0, 1\}^w \rightarrow \{0,1\}^n$ a pseudorandom generator secure against non-uniform adversaries, the construction $\Pi$=(Gen, Enc, Dec) for message space $\{0, 1\}^n$ works as follows:

Gen$(1^\lambda, 1^S)$: Sample a seed $s \leftarrow \{0, 1\}^d$ for the randomness extractor, a common random string $\text{crs} \in \{0, 1\}^{poly(\lambda,n)}$ for the HILL-Entropic Encoding, and a random pad $r \leftarrow \{0, 1\}^n$. Output $k=(s, r, \text{crs})$.

Enc$(k, m)$: To encrypt a message m, first parse $k=(s, r, \text{crs})$ and sample a random PRG seed $s' \leftarrow \{0,1\}^w$. Compute $c_1=\text{Code.Enc}_{crs}(1^\lambda, \text{PRG}(s') \oplus r \oplus (m)$ and $c_2=s' \oplus (\text{Ext}(c_1, s)$. The final ciphertext is $ct=(c_1, c_2)$.

Dec$(k, ct)$: First, parse $ct=(c_1, c_2)$ and $k=(s, r, \text{crs})$. Then compute $s'=\text{Ext}(c_1; s) \oplus c_2$ and obtain $m=\text{Code.Dec}_{crs}$ $(c_1) \oplus (\text{PRG}(s') \oplus r$.

Correctness follows from the original construction and should be easy to verify. Notice that by the $\alpha'$-expansion of the "good" HILL-entropic encoding, the ciphertexts have length $(1+o(1))n+w+\text{poly}(\lambda)=(1+o(1))n+\text{poly}(\lambda)$ (the poly $(\lambda)$ part is independent of n), while the messages have length n. Hence the scheme achieves an optimal rate of $1$ $((1-o(1))$ to be exact). The keys are bit longer though, having size $d+n+\text{poly}(\lambda, n)=n+\text{poly}(\lambda, n)$. Furthermore, prior work shows that the CRS needs to be at least as long as the message being encoded. Thus the key has length at least $2n+\text{poly}(\lambda)$.

Theorem 2. If Ext: $\{0, 1\}^n \times \{0, 1\}^d \rightarrow \{0, 1\}^w$ is $\alpha$ $(t, \alpha, \beta, \epsilon)$-somewhere randomness extractor with $$n = \frac{S}{(1-\alpha)t} + \text{poly}(\lambda),$$

Code=Enc, Dec) is a "good" HILL-entropic encoding with $\beta'$-HILL-entropy, and PRG is a pseudorandom generator secure against non-uniform adversaries, then Construction 2 is $(t, 1, (1-\beta)t, S)$-MULT-SIM-CPA secure.

The hybrid proof essentially follows the same structure from prior work, except for a different extractor step, the inclusion of the random pad r and the requirement of PRG to be secure against non-uniform attackers.

5.3 Dealing with Multiple Messages Per User

Above we have showed MULT-SIM-CPA security for SKE schemes where the number of messages per user 1 is equal to 1. Here, we show how we can generically lift a SKE scheme with single-message-per-user MULT-SIM-CPA security to multiple-messages-per-user MULT-SIM-CPA security.

Construction 3. Let $\lambda$, S be security parameters. Given SKE=(Gen, Enc, Dec) a $(\eta, 1, q, S)$-MULT-SIM-CPA secure SKE with key space $\{0,1\}^n$ [1] and $\mathcal{F}$ a class of l-wise independent functions with range $\{0, 1\}^n$, we construct $\Pi$=(Gen, Enc, Dec) as follows.

[1] Here we assume SKE's keys are uniformly random n-bit strings. This is without loss of generality since we can always take the key to be the random coins for Gen.

Gen$(1^\lambda, 1^S)$: Sample a random function $f \leftarrow \mathcal{F}$. Output $k=f$.

Enc$(k=f,m)$: Sample a short random string r with $|r|=\text{polylog}(l)$, compute $k'=f(r)$, and get $c \leftarrow \text{SKE.Enc}(k', m)$. Output $ct=(r, c)$.

Dec$(k=f, ct=(r, c))$: Compute $k'=f(r)$, and output $m \leftarrow \text{SKE.Dec}(k', c)$.

Correctness should be easy to verify given the correctness of the underlying SKE scheme and the deterministic property of the l-wise independent functions.

Lemma 7. If SKE is $\alpha(\eta, 1, q, S)$-MULT-SIM-CPA secure SKE with key space $\{0, 1\}^n$ and $\mathcal{F}$ is a class of l-wise independent functions with range $\{0, 1\}^n$, then Construction 3 is $(\eta/l, 1, q, S-\eta \cdot \text{polylog}(l))$-MULT-SIM-CPA secure.

6 Public Key Incompressible Encryption

Here we explore multi-user security of incompressible Public Key Encryptions (PKEs), considering constructions from prior work. Unlike the SKE setting, where we can generically lift single-ciphertext-per-user security to multi-ciphertext-per-user security, here we show how to obtain multi-ciphertext security by modifying each construction specifically.

6.1 Low Rate Incompressible PKE

For low rate incompressible PKE, we show that the construction from prior work is MULT-SIM-CPA secure by plugging in the somewhere randomness extractor. Then, we upgrade the construction to have multi-ciphertext-per-user security by upgrading the functionality of the underlying functional encryption scheme.

Construction by Prior Work.

We recall the low rate incompressible PKE construction of prior work, with the somewhere randomness extractor plugged in.

[1] Here we assume SKE's keys are uniformly random n-bit strings. This is without loss of generality since we can always take the key to be the random cois for Gen.

Construction 4. Given FE=(Setup, KeyGen, Enc, Dec) a single-key selectively secure functional encryption scheme and a $(t, \alpha, \beta, \epsilon)$-somewhere randomness extractor Ext: $\{0, 1\}^n \times \{0, 1\}^d \rightarrow \{0, 1\}^w$, with $d=\text{poly}(\lambda)$, $w=\text{poly}(\lambda)$ and $$n = \frac{S}{(1-\alpha)t} + poly(\lambda),$$

the construction $\Pi$=(Gen, Enc, Dec) with message space $\{0, 1\}^w$ works as follows:

Gen($1^\lambda$, $1^S$): First, obtain (FE.mpk, FE.msk)←FE.Setup ($1^\lambda$). Then, generate the secret key for the following function $f_v$ with a hardcoded $v \in \{0, 1\}^{d+w}$:

$$f_v(s' = (s, pad), flag) = \begin{cases} s' & \text{if flag} = 0 \\ s' \oplus v & \text{if flag} = 1 \end{cases}.$$

Output pk=FE.mpk and sk=FE.sk$_{f_v}$←FE.KeyGen (FE.msk, $f_v$).

Enc(pk, m): Sample a random tuple s'=(s, pad) where $s \in \{0, 1\}^d$ is used as a seed for the extractor and pad$\in \{0, 1\}^w$ is used as a one-time pad. The ciphertext consists of three parts: FE.ct←FE.Enc(FE.mpk, (s', 0)), a long randomness $R \in \{0, 1\}^n$, and z=Ext(R; s)$\oplus$pad$\oplus$m.

Dec(sk, ct=(FE.ct, R, z)): First, obtain s'←FE.Dec (FE.sk$_{f_v}$, FE.ct), and then use the seed s to compute Ext(R; s)$\oplus$z$\oplus$pad to recover m.

The correctness follows from the original construction.

Theorem 3. If FE is a single-key selectively secure functional encryption scheme and Ext: $\{0, 1\}^n \times \{0, 1\}^d \leftarrow \{0, 1\}^w$ is a (t, $\alpha$, $\beta$, $\epsilon$)-somewhere randomness extractor with d, w=poly($\lambda$) and $$n = \frac{S}{(1-\alpha)t} + poly(\lambda),$$

then Construction 4 is (t, 1, (1–$\beta$)t, S)-MULT-SIM-CPA secure.

Upgrade to Multiple Ciphertexts Per User.

Additionally, We show that the constructions from prior work can be upgraded to have multi-ciphertext-per-user security. Essentially, all we need is to upgrade the functionality of the underlying functional encryption scheme to work for a slightly more generalized class of functions. We will need functions $f_{\{v_i\}_i}$(s, flag)=s$\oplus v_{flag}$ for hard coded values $v_1, \ldots, v_l$ and a special $v_0$ being the all 0 string. Notice that the original prior work construction can be viewed as using functions that are a special case where l=1. We show how to construct FE schemes for such $f_{\{v_i\}_i}$ functions from plain PKE in Supplementary Material Section B. With this new class of functions, we can achieve (t, l, (1–$\beta$)lt, S)-MULT-SIM-CPA security. In the hybrid proof where we replace FE.Enc(FE.mpk, (s', 0)) with FE.Enc(FE.mpk, (s'$\oplus$v, 1)), now for the j-th message query for the i-th user where i$\in$[t] and j$\in$[l], we replace FE.Enc(FE.mpk$_i$, (s'$_{i,j}$, 0)) with FE.Enc (FE.mpk$_i$, (s$_{i,j}$'$\oplus$v$_{i,j}$)). The rest of the hybrid proof follows analogously.

6.2 Rate-1 Incompressible PKE

For rate-1 incompressible PKE, we first show that we can easily plug in the somewhere randomness extractor to the construction by prior work. We also provide a generalization on the prior work construction using a Key Encapsulation Mechanism (KEM) with a special non-committing property. For both constructions, we show how to adapt them to allow for multi-ciphertext-per-user security.

Prior Work Construction.

We first reproduce the rate-1 PKE construction from prior work, with the somewhere randomness extractors plugged in.

Construction 5. Given FE=(Setup, KeyGen, Enc, Dec) a rate-1 functional encryption scheme satisfying single-key semi-adaptive security, Ext: $\{0, 1\}^n \times \{0,1\}^d \rightarrow \{0, 1\}^w$ a (t, $\alpha$, $\beta$, $\epsilon$)-somewhere randomness extractor with d, w=poly($\lambda$), $$n = \frac{S}{(1-\alpha)t} + poly(\lambda)$$

and PRG: $\{0, 1\}^w \rightarrow \{0, 1\}^n$ a secure PRG against non-uniform adversaries, the construction $\Pi$=(Gen, Enc, Dec) for message space $\{0, 1\}^n$ works as follows:

Gen($1^\lambda$, $1^S$): First, obtain (FE.mpk, FE.msk)←FE.Setup ($1^\lambda$). Then, generate the secret key for the following function $f_{v,s}$ with a hardcoded large random pad $v \in \{0, 1\}^n$ and a small extractor seed $s \in \{0, 1\}^d$:

$$f_{v,s}(x, flag) = \begin{cases} x & \text{if flag} = 0 \\ PRG(\text{Extract}(x; s)) \oplus v & \text{if flag} = 1 \end{cases}.$$

Output pk=FE.mpk and sk=FE.sk$_{f_{v,s}}$←FE.KeyGen (FE.msk, $f_{v,s}$).

Enc(pk, m): The ciphertext is simply an encryption of (m, 0) using the underlying FE scheme, i.e. FE.ct←FE.Enc (FE.mpk, (m, 0)).

Dec(sk, ct): Decryption also corresponds to FE decryption.

The output is simply FE.Dec(FE.sk$_{f_{v,s}}$,ct)=$f_{v,s}$(m, 0)=m as desired.

Correctness easily follows from the original construction. The rate of the construction is the rate of the underlying FE multiplied by $$\frac{n}{n+1}.$$

If the FE has rate (1–o(1)), the construction has rate (1–o(1)) as desired.

Theorem 4. If FE=(Setup, KeyGen, Enc, Dec) is a single-key semi-adaptively secure functional encryption scheme, Ext: $\{0, 1\}^n \times \{0, 1\}^d \rightarrow \{0, 1\}^w$ is a (t, $\alpha$, $\beta$, $\epsilon$)-somewhere randomness extractor, with d, w=poly($\lambda$) and $$n = \frac{S}{(1-\alpha)t} + poly(\lambda),$$

and PRG: $\{0, 1\}^w \rightarrow \{0, 1\}^n$ is a PRG secure against non-uniform adversaries, then Construction 5 is (t, 1, (1–$\beta$)t, S)-MULT-SIM-CPA secure.

Upgrade to Multiple Ciphertexts Per User.

Upgrading Construction 5 to multi-ciphertext-per-user security is rather straightforward. Since the construction already requires a full functionality FE scheme, we just modify the class of functions that the underlying FE scheme uses, without introducing any new assumptions. Specifically, we use the class of functions $f_{\{v_j\}_j,\{s_j\}_j}$ with hard-coded values $v_j \in \{0, 1\}^n$ and $s_j \in \{0, 1\}^d$ for j$\in$[l] that behaves as follows:

$$f_{\{v_j\}_j,\{s_j\}_j}(x, \text{flag}) = \begin{cases} x & \text{if flag} = 0 \\ PRG(\text{Extract}\,(x; s_{flag})) \oplus v_{flag} & \text{if flag} \in [\ell] \end{cases}.$$

This gives us $(t, l, (1-\alpha)lt, S)$-MULT-SIM-CPA security. Notice that this modification does slightly harm the rate of the scheme, since the flag is now $\log(l)$ bits instead of one bit, but asymptotically the rate is still $(1-o(1))$.

The hybrid proof works analogously to that of Theorem 4, except that in the hybrid proof where we swap the FE encryption of $(m, 0)$ to $(R, 1)$, we now swap from $(m_{i,1}, 0)$ to $(R_{i,j}, j)$ for the j-th ciphertext from the i-th user.

Generalization of Prior Work Construction.

Prior work shows how to lift a rate-1 incompressible SKE scheme to a rate-1 incompressible PKE scheme using a Key Encapsulation Mechanism built from programmable Hash Proof Systems (HPS). Their construction satisfy CCA2 security. We show that if we are to relax the security notion to only CPA security, all we need for the lifting is a Key Encapsulation Mechanism with a non-committing property, defined as follows.

Definition 7 (Key Encapsulation Mechanism). Let $\lambda$ be the security parameters, a Key Encapsulation Mechanism (KEM) is a tuple of algorithms $\Pi$=(KeyGen, Encap, Decap) that works as follow:

KeyGen($1^\lambda$, $1^{\mathcal{L}_k}$)$\to$(pk,sk): The key generation algorithm takes as input the security parameter and the desired symmetric key length $\mathcal{L}_k$, outputs a pair of public key and private key (pk, sk).

Encap(pk)$\to$(k,c): The encapsulation algorithm takes the public key pk, produces a symmetric key k$\in \{0, 1\}^{\mathcal{L}_k}$, and a header c that encapsulates k.

Decap(sk, c)$\to$k: The decapsulation algorithm takes as input the private key sk and a header c, and decapsulates the header to get the symmetric key k.

We require correctness of the KEM.

Definition 8 (Correctness). A key encapsulation mechanism KEM=(KeyGen, Encap, Decap) is said to be correct if:

$$Pr\left[k' = k : \begin{array}{l} (pk, sk) \leftarrow KeyGen(1^\lambda, 1^{\mathcal{L}_k}) \\ (k, c) \leftarrow Encap(pk) \\ k' \leftarrow Decap(sk, c) \end{array}\right] \geq 1 - negl(\lambda).$$

Definition 9 (Non-Committing). A key encapsulation mechanism KEM=(KeyGen, Encap, Decap) is said to be non-committing if there exists a pair of simulator algorithm $(\text{Sim}_1, \text{Sim}_2)$ such that $\text{Sim}_1(1^\lambda, 1^{\mathcal{L}_k})$ outputs a simulated public key pk', a header c' and a state st with $|st|$=poly $(\lambda, \mathcal{L}_k)$, and for any given target key k'$\in \{0, 1\}^{\mathcal{L}_k}$, $\text{Sim}_2$(st, k') outputs the random coins $r^{KeyGen}$ and $r^{Encap}$. We require that if we run the key generation and encapsulation algorithm using these random coins, we will get the desired pk', c', and k', i.e.:

$$Pr\left[\begin{array}{l} pk' = pk \\ k' = k \\ c' = c \end{array} : \begin{array}{l} (pk, sk) \leftarrow KeyGen(1^\lambda, 1^{\mathcal{L}_k}; r^{KeyGen}) \\ (k, c) \leftarrow Encap(pk; r^{Encap}) \end{array}\right] \geq 1 - negl(\lambda).$$

By the correctness property, Decap(sk, c')$\to$k'.

This non-committing property allows us to commit to a public key and header first, but then later able to reveal it as an encapsulation of an arbitrary symmetric key in the key space. And it will be impossible to distinguish the simulated public key and header from the ones we get from faithfully running KeyGen and Encap.

Using this non-committing KEM, we are able to construct rate-1 incompressible PKE from rate-1 incompressible SKE, with multi-user security in mind. This is a generalization of the prior work construction.

Construction 6 (Generalization of Prior Work). Let $\lambda$, S be security parameters. Given KEM=(KeyGen, Encap, Decap) a non-committing KEM and SKE=(Gen, Enc, Dec) a rate-1 incompressible SKE for message space $\{0, 1\}$, we construct rate-1 incompressible PKE $\Pi$=(Gen, Enc, Dec) for message space $\{0, 1\}^n$ as follows:

Gen($1^\lambda$, $1^S$): First, run SKE.Gen($1^\lambda$, $1^S$) to determine the required symmetric key length $\mathcal{L}_k{}_k$ under security parameters $\lambda$, S. Then run (pk,sk)$\leftarrow$KEM.KeyGen($1^\lambda$, $1^{\mathcal{L}_k{}_k}$) and output (pk, sk).

Enc(pk, m): First, run (k, $c_0$)$\leftarrow$KEM.Encap(pk) to sample a symmetric key k, and encapsulate it into a header $c_0$. Then compute $c_1\leftarrow$SKE.Enc(k, m). The ciphertext is the tuple ($c_0$, $c_1$).

Dec(sk, ct=($c_0$, $c_1$)): First, decapsulate $c_0$ using sk to obtain k$\leftarrow$KEM.Decap(sk, $c_0$), and then use k to decrypt $c_1$ and get m$\leftarrow$SKE.Dec(k, $c_1$).

Correctness follows from the correctness of the underlying incompressible SKE and the KEM scheme. In terms of the rate, to achieve a rate-1 incompressible PKE, we would require the KEM to produce "short" headers, i.e. $|c_0|$=poly $(\lambda)$ independent of $\mathcal{L}_k{}_k$ (notice that $\mathcal{L}_k$=poly$(\lambda, n)$ and needs to be at least as large as n). We can build such KEMs using various efficient encapsulation techniques. With the short header and an incompressible SKE with rate $(1-o(1))$, the ciphertext length is $n/(1-o(1))+poly(\lambda)$, yielding an ideal rate of $(1-o(1))$ for the construction. However, these KEMs require long public keys, as opposed to the short public keys in Construction 5.

For security, we prove that if the underlying SKE has MULT-SIM-CPA security, then Construction 6 has MULT-SIM-CPA security as well.

Theorem 5. If KEM is a non-committing KEM, and SKE is a $(\eta, 1, q, S)$-MULT-SIM-CPA secure SKE with message space $\{0, 1\}^n$, then Construction 6 is $(\eta, 1, q, S-\eta\cdot poly(\lambda, n))$-MULT-SIM-CPA secure.

Upgrade to Multiple Ciphertexts Per User.

Next we show how to upgrade Construction 6 to have multi-ciphertext-per-user security. All we need is to upgrade the KEM to be l-strongly non-committing, defined as below.

Definition 10 (l-Strongly Non-Committing). A key encapsulation mechanism KEM=(KeyGen, Encap, Decap) is said to be l-strongly non-committing if there exists a pair of simulator algorithm $(\text{Sim}_1, \text{Sim}_2)$ such that $\text{Sim}_1(1^\lambda, 1^{\mathcal{L}_k{}_k})$ outputs a simulated public key pk', a set of simulated headers $\mathcal{A}'=\{c_1', c_2', \ldots, c_l'\}$ and a state st with $|st|$=poly $(\lambda, \mathcal{L}_k{}_k, l)$, and for any given set of target keys $$k^{\rightarrow} = \{k_1', k_2', \ldots, k_\ell'\}$$

where $$k_i' \in \{0, 1\}^{\mathcal{L}_k}$$

for all $i \in |l|$, $Sim_2(st, \kappa')$ outputs a set of random coin pairs $$\{(r_i^{KeyGen}, r_i^{Encap})\}_{i \in [l]}.$$

We require that if we run the key generation and encapsulation algorithm using the i-th pair of these random coins, we will get the desired pk', $$c_i',$$

and $$k_i',$$

i.e. for all $i \in [l]$:

$$Pr\left[\begin{matrix} pk' = pk \\ k_i' = k \\ c_i' = c \end{matrix} : \begin{matrix} (pk, sk) \leftarrow KeyGen(1^\lambda, 1^{\mathcal{L}_k}; r_i^{KeyGen}) \\ (k, c) \leftarrow Encap(pk; r_i^{Encap}) \end{matrix}\right] \geq 1 - negl(\lambda).$$

Kindly notice that by the correctness property, $$Decap(sk, c_i') \to k_i'.$$

We show how to construct l-strongly non-committing KEMs by composing plain non-committing KEMs in Supplementary Material C.

To get multi-ciphertext security, we simply plug in the l-strongly non-committing KEM in place of the plain non-committing KEM in construction 6. The resulting construction has $(\eta/l, l, q, S-\eta \cdot poly(\lambda, n, l))$-MULT-SIM-CPA security.

A Definitions

A.1 Incompressible Encryption
Incompressible PKE.

First, recall the definition of incompressible public key encryption (PKE) by Guan, Wichs, and Zhandry. The syntax of an incompressible PKE scheme is analogous to that of a classical PKE scheme, except that Gen takes an additional security parameter S, which is the space bound of the adversary('s long term storage). The "rate" of the scheme is defined as the ratio of the message length to the ciphertext length. Note that the rate is always between 0 and 1, with 1 being the ideal rate, meaning that the ciphertext does not add any overhead to the message length.

The security is defined through the following experiment $$Dist_{\mathcal{A},\Pi}^{IncomPKE}(\lambda):$$

1. The adversary $\mathcal{A}_1$ takes $1^\lambda$, and outputs a space bound $1^S$.
2. Run Gen($1^\lambda$, $1^S$) to obtain keys (pk,sk).
3. Sample a uniform bit $b \in \{0, 1\}$.

4. The adversary is given the public key pk and submits an auxiliary input aux.
5. The adversary submits the challenge query consisting of two messages $m_0$ and $m_1$, and receives ct←Enc(pk, $m_b$).
6. $\mathcal{A}_1$ produces a state st of size at most S.
7. The adversary $\mathcal{A}_2$ is given the tuple (pk, sk, aux, st) and outputs a guess b' for b. If b'=b, we say that the adversary succeeds and the output of the experiment is 1. Otherwise, the experiment outputs 0.

Definition 11 (Incompressible PKE Security). Let $\lambda$ and S be security parameters. A public key encryption scheme $\Pi$=(Gen, Enc, Dec) is said to have incompressible PKE security if for all PPT adversaries $\mathcal{A}$ =($\mathcal{A}_1$, $\mathcal{A}_2$):

$$Pr\left[Dist_{\mathcal{A},\Pi}^{IncomPKE}(\lambda) = 1\right] \leq \frac{1}{2} + negl(\lambda).$$

Incompressible SKE.

One can also imagine an analogous incompressible symmetric key encryption (SKE) scheme. This object has been studied earlier by Dziembowski under the name forward-secure storage. The syntax of an incompressible SKE also follows a standard SKE scheme. The "rate" is also defined the same as the ratio of the message length to the ciphertext length. The security of an incompressible SKE can be analogously defined through the following experiment $$Dist_{\mathcal{A},\Pi}^{IncomSKE}(\lambda):$$

1. The adversary $\mathcal{A}_1$ takes $1^\lambda$, and outputs a space bound $1^S$.
2. Run Gen($1^\lambda$, $1^S$) to obtain the key k.
3. Sample a uniform bit $b \in \{0, 1\}$.
4. The adversary submits an auxiliary input aux.
5. The adversary submits the challenge query consisting of two messages $m_0$ and $m_1$, and receives ct←Enc(k, $m_b$).
6. $\mathcal{A}_1$ produces a state st of size at most S.
7. The adversary $\mathcal{A}_2$ is given the tuple (k, aux, st) and outputs a guess b' for b. If b'=b, we say that the adversary succeeds and the output of the experiment is 1. Otherwise, the experiment outputs 0.

Definition 12 (Incompressible SKE Security). Let $\lambda$ and S be security parameters. A symmetric key encryption scheme $\Pi$=(Gen, Enc, Dec) is said to have incompressible SKE security if for all PPT adversaries $\mathcal{A}$ =($\mathcal{A}_1$, $\mathcal{A}_2$):

$$Pr\left[Dist_{\mathcal{A},\Pi}^{IncomSKE}(\lambda) = 1\right] \leq \frac{1}{2} + negl(\lambda).$$

A.2 Functional Encryption

The constructions by prior work use single-key game-based functional encryption as a building block. Let $\lambda$ be the security parameter. Let $\{\mathcal{C}_\lambda\}$ be a class of circuits with input space $\mathcal{X}_\lambda$ and output space $\mathcal{Y}_\lambda$. A functional encryption scheme for the circuit class $\{\mathcal{C}_\lambda\}$ is a tuple of PPT algorithms FE=(Setup, KeyGen, Enc, Dec) defined as follows:

Setup($1^\lambda$)→(mpk, msk) takes as input the security parameter $\lambda$, and outputs the master public key mpk and the master secret key msk.

KeyGen(msk, C)→$sk_C$ takes as input the master secret key msk and a circuit $C \in \{C_\lambda\}$, and outputs a function key $sk_C$.

Enc(mpk, m)→ct takes as input the public key mpk and a message $m \in \mathcal{X}_\lambda$, and outputs the ciphertext ct.

Dec($sk_C$, ct)→y takes as input a function key $sk_C$ and a ciphertext ct, and outputs a value $y \in \mathcal{Y}_\lambda$.

We can analogously define the "rate" of an FE scheme to be the ratio between the message length to the ciphertext length. We require correctness and security of a functional encryption scheme.

Definition 13 (Correctness). A functional encryption scheme FE=(Setup, KeyGen, Enc, Dec) is said to be correct if for all $C \in \{C_\lambda\}$ and $m \in \mathcal{X}_\lambda$:

$$Pr\left[y = C(m) : \begin{array}{l} (mpk, msk) \leftarrow \text{Setup}\,(1^\lambda) \\ sk_C \leftarrow KeyGen(msk, C) \\ ct \leftarrow Enc(mpk, m) \\ y \leftarrow Dec(sk_C, ct) \end{array}\right] \geq 1 - negl(\lambda).$$

Consider the following Semi-Adaptive Security Experiment, $$Dist_{FE,\mathcal{A}}^{SemiAdpt}(\lambda):$$

Run FE.Setup($1^\lambda$) to obtain (mpk, msk) and sample a random bit $b \leftarrow \{0, 1\}$.

On input $1^\lambda$ and mpk, The adversary $\mathcal{A}$ submits the challenge query consisting of two messages $m_0$ and $m_1$. It then receives ct←FE.Enc(mpk, $m_b$).

The adversary now submits a circuit $C \in \{C_\lambda\}$ s.t. $C(m_0) = C(m_1)$, and receives $sk_C$←FE.KeyGen(msk, $C$).

The adversary $\mathcal{A}$ outputs a guess b' for b. If b'=b, we say that the adversary succeeds and experiment outputs 1. Otherwise, the experiment outputs 0.

Definition 14 (Single-Key Semi-Adaptive Security). For security parameter $\lambda$, a functional encryption scheme FE= (Setup, KeyGen, Enc, Dec) is said to have single-key semi-adaptive security if for all PPT adversaries $\mathcal{A}$:

$$Pr\left[Dist_{FE,\mathcal{A}}^{SemiAdpt}(\lambda) = 1\right] \leq \frac{1}{2} + negl(\lambda).$$

We can also consider selective security, where the adversary only receives mpk after sending the challenge messages.

B Instantiating FE for $f_{\{v_i\}_i}$ Functions

Here we show how to construct the FE scheme for the new class of functions that we need to upgrade construction 4 to have multi-ciphertext-per-user security. We only need plain PKE for the construction. Recall that our functions $f_{\{v_i\}_i}$ have the form $f_{\{v_i\}_i}$ (s, flag)=$s \oplus v_{flag}$, where flag∈ $\{0, 1, \ldots, 1\}$.

Construction 7. Let (Gen', Enc', Dec') be a public key encryption scheme. Our scheme FE=(Setup, KeyGen, Enc, Dec) for a single message bit s is defined as:

Setup($1^\lambda$): For $i \in \{0, 1, \ldots, n\}$, $b \in \{0, 1\}$, run ($pk_{i,b}$, $sk_{i,b}$)←Gen'($1^\lambda$). Output (mpk=$\{pk_{i, b}\}_{i,b}$, msk= $\{sk_{i,b}\}_{i,b}$).

KeyGen(msk, $f_{\{v_i\}_i}$)=$\{sk_{i,v_i}\}_i$. Notice that we hardcode $v_0$=0.

Enc(mpk, (s, flag)): Sample uniformly random bits $s^{(0)}$, $s^{(1)}, \ldots, s^{(n)}$ s.t. $s^{(0)} \oplus s^{(1)} \oplus \ldots \oplus s^{(n)}$=s. For $i \in \{0, 1, \ldots, n\} \setminus \{flag\}$, $b \in \{0, 1\}$, compute $c_{i,b}$=Enc'($pk_{i,b}$, $s^{(i)}$). For $b \in \{0, 1\}$, compute $c_{flag,b}$=Enc'($pk_{i,b}$, $s^{(flag)} \oplus$(b)). Output c=$(c_{i,b})_{i,b}$.

Dec($f_{\{v_i\}_i}$, c): Output x=$x^{(0)} \oplus x^{(1)} \oplus \ldots \oplus x^{(n)}$ where $x^{(i)}$=Dec'($sk_{i,v_i}$, $c_{i,v_i}$)

For correctness, note that for i≠flag, $x^{(i)}$=$s^{(i)}$, and that $x^{(flag)}$=$s^{(flag)} \oplus v_{flag}$, therefore x=$s^{(0)} \oplus s^{(1)} \oplus \ldots \oplus s^{(n)} \oplus v_{flag}$=$s \oplus v_{flag}$.

Lemma 8. If (Gen', Enc', Dec') is a CPA secure public key encryption scheme, then Construction 7 is single key semi-adaptively secure for the functions $f_{\{v_i\}_i}$.

C Instantiating l-Strongly Non-Committing KEM

In this section, we give a simple construction of l-strongly non-committing KEM by composing 2l plain non-committing KEMs.

Construction 8. Let $KEM_1$, $KEM_2$, $\ldots$, $KEM_n$ be n=2l instances of non-committing KEMs, we construct an l-strongly non-committing KEM $\Pi$=(KeyGen, Encap, Decap) as follows:

KeyGen($1^\lambda$, $1^{\mathcal{L}_k \cdot k}$): For each $i \in [n]$, run ($pk_i$, $sk_i$) ←$KEM_i$.KeyGen($1^\lambda$, $1^{\mathcal{L}_k \cdot k}$). Publish pk=$\{pk_i\}_i$ and sk=$\{sk_i\}_i$.

Encap(pk): Sample a random subset $I \subseteq [n]$, for all $i \in I$, get ($k_i$, $c_i$)←$KEM_i$.Encap($pk_i$). Output k=$\oplus_{i \in I} k_i$, and c=(I, $\{c_i\}_i$).

Decap(sk, c): First parse c=(I, $\{c_i\}_i$), then for all $i \in I$, get $k_i$←$KEM_i$.Decap($sk_i$, $c_i$). Output k=$\oplus_{i \in I} k_i$.

Correctness is trivial given the correctness of the underlying KEMs. The public key, private key and header sizes all blow up by a factor of n.

Lemma 9. If $KEM_1$, $KEM_2$, $\ldots$, $KEM_n$ are non-committing KEMs, then construction 8 is l-strongly non-committing.

D Incompressible Encryption in the Random Oracle Model

D.1 Rate-1 Incompressible SKE from Random Oracles

We show how to build rate-1 incompressible SKE in the random oracle model.

Construction 9. Let $\lambda$, S be security parameters. Given G: $\{0, 1\}^{poly(\lambda)} \times \{0, 1\}^{poly(\lambda)} \rightarrow \{0, 1\}^n$, H: $\{0, 1\}^{poly(\lambda)} \times \{0, 1\}^n \rightarrow \{0, 1\}^{poly(\lambda)}$ two hash functions modelled as random oracles, we construct $\Pi$=(Gen, Enc, Dec) for message space $\{0, 1\}^n$ as follows:

Gen($1^\lambda$, $1^S$): Sample a uniformly random key $k \in \{0, 1\}^{poly(\lambda)}$. Output k.

Enc(k, m): First, choose a random $r \leftarrow \{0, 1\}^{poly(\lambda)}$. Let d=G(k, r)$\oplus$m. Then let c=H(k, d)$\oplus$r. Output ct=(c, d).

Dec(k, ct=(c, d)): First, Compute r=H(k, d)$\oplus$c, and then m=G(k, r)$\oplus$d.

Correctness is easy to verify given that G and H are deterministic. The ciphertext has length |c|+|d|=n+poly($\lambda$), which gives an ideal rate of (1−o(1)). The secret key size is poly($\lambda$), which is also optimal.

The construction has $$\left(2^\lambda, 2^\lambda, \frac{S}{n}, S\right)\text{-}MULT\text{-}SIM\text{-}CPA$$

security. Notice that this security holds for an unbounded (exponential) number of ciphertexts per user.

Theorem 6. If G, H are hash functions modelled as random oracles, then construction 9 is $$\left(2^{\lambda}, 2^{\lambda}, \frac{S}{n}, S\right) - MULT-SIM-CPA$$

secure.

D.2 Rate-1 Incompressible PKE from Random Oracles

We then show how to construct rate-1 incompressible PKE from random oracles, plain PKE, and rate-1 incompressible SKE. The construction is essentially a hybrid mode PKE with random oracles plugged in. Notice that this construction can be viewed as a generalization of Construction 5 in Section 7.1 of Prior Work.

Construction 10. Let $\lambda$, S be security parameters. Given PKE'=(Gen', Enc', Dec') a plain PKE scheme with many-time CPA security, SKE=(Gen, Enc, Dec) a rate-1 incompressible SKE with $(2^{\lambda}, 1, q, S)$-MULT-SIM-CPA security, message space $\{0, 1\}^n$ and key space $\{0, 1\}^{\mathcal{L}_k}$, and H: $\{0,1\}^{poly(\lambda)} \rightarrow \{0, 1\}^{\mathcal{L}_k}$ a hash function modelled as a random oracle, we construct $\Pi$=(Gen, Enc, Dec) for message space $\{0, 1\}^n$ as follows:

Gen($1^{\lambda}$, $1^S$): Run (pk, sk)←PKE'.Gen'($1^{\lambda}$). Output (pk, sk).

Enc(pk,m): Sample a short random r∈ $\{0,1\}^{poly(\lambda)}$. Compute c←PKE'.Enc'(pk,r) and d←SKE.Enc(H(r), m). Output ct=(c, d).

Dec(sk, ct=(c, d)): Get r←PKE'.Dec'(sk, c), and output m←SKE.Dec(H(r), d).

It is easy to see that given the correctness of PKE' and SKE and that H is deterministic, this construction is correct. The ciphertexts have length |c|+|d|=n+poly($\lambda$), yielding an ideal rate of (1−o(1)). The public key and the private key both have size poly($\lambda$), which is optimal.

We show that the construction has $(2^{\lambda}, 2^{\lambda}, q, S)$-MULT-SIM-CPA security.

Theorem 7. If PKE' has many-time CPA security, SKE has $(2^{\lambda}, 1, q, S)$-MULT-SIM-CPA security, and H is a hash function modelled as a random oracle, then construction 10 is $(2^{\lambda}, 2^{\lambda}, q, S)$-MULT-SIM-CPA secure.

Remark 7. By using construction 9 as the incompressible SKE scheme in construction 10, we would get a rate-1, random oracle based, incompressible PKE scheme for message space $\{0, 1\}^n$ that has $$\left(2^{\lambda}, 2^{\lambda}, \frac{S}{n}, S\right) - MULT - SIM - CPA$$

security.

E System Implementations

FIG. 1 illustrates an example system for transmitting and receiving an encrypted message over a network. A system for supporting multiple users, in some embodiments originating multiple encrypted messages, and transmitting the encrypted messages is disclosed. Original data or other forms of information, can be stored in a transmitter side data store for multiple users, illustrated as message$_1$ 115, message$_2$ 120, up to an arbitrarily large number of messages, including a message$_n$ 125. Each of the messages 115, 120, 125, can be associated with a respective target length parameter, 116, 121, 126 (CT$_1$ ... $_n$).

The respective encryption modules 130, 131, 132 can be configured to encrypt their input messages based on the respective predetermined target length parameters 116, 121, 126, so that the output ciphertext is expanded to have the predetermined target length. The messages can be encoded or encrypted using encoders 130, 131, 132, according to the data expansion constructions described herein. The expanded messages can then be transmitted by a transmitter or multiple respective transmitters over a channel 135 to receivers 140. After being received at receivers 140, the messages are decrypted using decryptors 145 according to the constructions described herein, and stored in the decryptor data store 150. The decryptor can be configured in such a way that the output of the decryptor is limited to be one of the original message, a completely unrelated message, or no message at all, such as a failure state. The output of the decryptor(s) is then input to notifier 155 which can be configured to provide the output of decryptor to an operator, such as an individual or a further system configured to operate on the output.

It is possible that the output of one or more of the encryption modules 130, 131, 132 may be intercepted while in channel 135. Using the multi-incompressible encryption constructions described herein, an adversary whose storage capacity is sufficiently below the total size of the intercepted ciphertexts will not be able to learn anything about the contents of the vast majority of the encrypted messages, even if it later gets all the decryption keys.

This subject matter may be implemented as-a-service. As described herein, and without limitation, the subject matter may be implemented within or in association with a cloud deployment platform system or appliance, or using any other type of deployment systems, products, devices, programs or processes. The various modules and related response or notifier system functionality may be provided as a stand-alone function, or it may leverage functionality from other products and services.

A representative cloud application platform with which the technique may be implemented includes, without limitation, any cloud-supported application framework, product or service.

The techniques disclosed herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the generator service be executed by a particular component as named above, as the functionality herein (or any aspect thereof) may be implemented in other or systems.

The tool and response functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes and not meant to limit the scope of the described subject matter.

More generally, computing devices within the context of the disclosed subject matter are each a data processing system (such as shown in FIGS. 4 and 5) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the sensitive data detection service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, data detection security analysis tools and systems, and cloud-based systems, as well as improvements to the functioning of automated sensitive data detection tools and methods.

FIGS. 4 and 5 depict example computer systems useful for implementing various embodiments described in the present disclosure. Various embodiments may be implemented, for example, using one or more computer systems, such as computer system 500 shown in FIG. 4. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 5 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 4 and 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A computerized method for message encryption for a plurality of users, each user associated with one or more messages, the method comprising:

(a) for at least one user:

(i) receiving, by a processor, a message m of arbitrary length for the at least one user and storing the message m in a non-transitory computer-readable memory;

(ii) storing, in the non-transitory computer-readable memory, a predetermined target ciphertext length for the at least one user, wherein the predetermined target ciphertext length is determined based on at least one of a desired security level, capacity of communication channel, or storage capabilities of the non-transitory computer-readable memory;

(iii) executing, by the processor, a setup process comprising:

(A) instantiating a functional encryption scheme, wherein the functional encryption scheme comprises a setup algorithm, a key generation algorithm, an encryption algorithm, and a decryption algorithm, and wherein the setup algorithm generates a master secret key msk and a master public key mpk;

(B) generating a random variable v;

(C) defining a function $f_v$ based on the random variable v, wherein $f_v$ receives an input (s', flag), where s' is a composite string, and flag is a binary flag, and outputs s' when flag=0 and outputs s'$\oplus$v when flag=1, wherein $\oplus$ denotes a bit-wise exclusive-or (XOR) operation; and (D) deriving a secret key $sk_v$ by executing the key generation algorithm of the functional encryption scheme based on $f_v$ and the master secret key msk;

(iv) encrypting, by the processor, the message m by:

(A) generating a first random string r having a length based on the predetermined target ciphertext length;

(B) generating an at least partially random second string u comprising a random seed s for a randomness extractor Ext and a random pad t, wherein the at least partially random second string u has a last bit set to 0;

(C) encrypting the at least partially random second string u under the functional encryption scheme using the master public key mpk to generate a ciphertext c;

(D) deriving z from the first random string r, the at least partially random second string u, and the message m by applying the randomness extractor Ext to the first random string r using the random seed s from the at least partially random second string u as a seed, and applying a bit-wise exclusive-or (XOR) operation to combine a result of the randomness extractor Ext with the message m and the random pad t from the at least partially random second string u; and (E) outputting z, the first random string r, and the ciphertext c, wherein z, the first random string r, and the ciphertext c together constitute a complete encrypted output, and storing the complete encrypted output in the non-transitory computer-readable memory;

(b) transmitting, via a communication channel, the complete encrypted output to a receiver;

wherein the message m and the predetermined target ciphertext length are independently selectable for each of the plurality of users.

2. The method of claim 1, wherein the randomness extractor Ext is a somewhere randomness extractor, wherein the somewhere randomness extractor satisfies a property that for a positive integer T and for any T random variables $X_1, \ldots, X_T$ with joint min-entropy rate $\alpha$, where $\alpha$ is a value between 0 and 1, for a T random and independent seeds $S_1, \ldots, S_T$, close to an $\alpha$-fraction of extracted outputs $Y_i=Ext(X_i;S_i)$, where i is an index ranging from 1 to T, is guaranteed to be jointly statistically indistinguishable from uniform, even given all other extracted outputs not in said $\alpha$-fraction and all random and independent seeds.

3. The method of claim 2, wherein the somewhere randomness extractor Ext(r; s), wherein r is the first random string, is constructed based on Reed-Muller codes, wherein:

(a) an input $r \in \{0,1\}^n$, where $\{0,1\}^n$ denotes a set of n-bit binary strings, is interpreted as an l-variate polynomial of total degree g over a finite field $$\mathbb{F}_{2^w}$$

having $2^w$ elements, where l is a positive integer representing a number of variables in the polynomial, g is a positive integer representing total degree of the polynomial, w is a positive integer representing a field size parameter, and n is determined by $$n = w \cdot \binom{\ell + g}{g}, \text{ where } \binom{\ell + g}{g}$$

is a binomial coefficient representing a number of coefficients in the polynomial;

(b) a seed $$s = (s_1, s_2) \text{ consists of } s_1 \in \mathbb{F}_{2^w}^{\ell},$$

representing l field elements used as evaluation points, and $$s_2 \in \mathbb{F}_{2^m}^{w/m},$$

representing field elements used for dot product, where m is a positive integer representing an output length in bits; and

(c) an output of the extractor Ext is $<r(s_1), s_2>$, wherein polynomial evaluation $y=r(s_1)$ is performed over the finite field $$\mathbb{F}_{2^w}$$

by evaluating the polynomial defined by r at the point $s_1$, and dot product $<y, s_2>$ is performed over $$\mathbb{F}_{2^m}$$

by computing an inner product of y and $s_2$.

4. The method of claim 1, wherein the defining a function $f_v$ based on the random variable v further comprises: receiving an input string; based on a last bit of the at least partially random second string u, if the last bit is 0, then outputting the random seed s and the random pad t; and if the last bit is 1, then outputting the composite string comprising the random seed s and the random pad t, XOR'd with the random variable v.

5. The method of claim 1, wherein the communication channel comprises a network, and wherein the transmitting comprises electronically transmitting the ciphertext cover the network to the receiver.

6. A computerized method for decrypting an encrypted message, the method comprising:

(a) receiving, by a processor from a non-transitory computer-readable memory, a ciphertext c, a first random string r, and a derived value z, wherein the ciphertext c was generated by encrypting a second string u under a functional encryption scheme, wherein the functional encryption scheme comprises a setup algorithm, a key generation algorithm, an encryption algorithm, and a decryption algorithm;

(b) retrieving, from the non-transitory computer-readable memory, a derived secret key $sk_v$, wherein $sk_v$ was generated by executing the key generation algorithm of the functional encryption scheme based on a function $f_v$ and a master secret key msk, and wherein $f_v$ receives an input (s', flag), where s' is a composite string comprising a random seed s and a random pad t, flag is a binary flag, and v is a random variable, and outputs s' when flag=0 and outputs s'⊕v when flag=1, wherein ⊕ denotes a bit-wise exclusive-or (XOR) operation;

(c) processing, by the processor, the derived secret key $sk_v$ and the ciphertext c using the decryption algorithm of the functional encryption scheme to derive a string s', wherein the string s' comprises the random seed s and the random pad t;

(d) decomposing s' into a seed component s and a pad component t;

(e) applying a somewhere randomness extractor Ext to the first random string r using the random seed s as a seed, wherein the somewhere randomness extractor is a function Ext: $\{0,1\}^n \times \{0,1\}^d \rightarrow \{0,1\}^w$, wherein $\{0,1\}^n$ denotes the set of n-bit binary strings, n is a positive integer representing an input length in bits, d is a positive integer representing a seed length in bits, and w is a positive integer representing an output length in bits, that guarantees extraction properties when applied to correlated sources with sufficient joint min-entropy;

(f) deriving a plaintext message m by computing m=Ext(r; s)⊕t⊕z, wherein z encodes the plaintext message m and wherein z, r, and c together form a complete ciphertext; and (g) storing the plaintext message m in the non-transitory computer-readable memory.

7. The method of claim 6, wherein the ciphertext c, the first random string r, and the derived value z were received via a communication channel from a sender.

8. The method of claim 6, wherein the somewhere randomness extractor Ext satisfies a property that for a positive integer T and for any T random variables $X_1, \ldots, X_T$ with joint min-entropy rate $\alpha$, where $\alpha$ is a value between 0 and 1, there exists a random variable $I_X$ denoting a subset of at least $\beta \cdot T$ indices, where $\beta$ is a value between 0 and 1 representing a minimum fraction of indices for which extraction guarantees hold, such that extracted outputs $Y_i = \text{Ext}(X_i; S_i)$ for $i \in I_X$, where i is an index ranging from 1 to T, are statistically indistinguishable from uniform even given all seeds $S_i$ and all other extracted outputs not in said subset $I_X$.

9. The method of claim 8, wherein the somewhere randomness extractor Ext(r; s), wherein r is the first random string, is constructed based on Reed-Muller codes, wherein:

(a) an input $r \in \{0,1\}^n$, where $\{0,1\}^n$ denotes a set of n-bit binary strings, is interpreted as an l-variate polynomial of total degree g over a finite field $$\mathbb{F}_{2^w}$$

having $2^w$ elements, where l is a positive integer representing a number of variables in the polynomial, g is a positive integer representing total degree of the polynomial, w is a positive integer representing a field size parameter, and n is determined by $$n = w \cdot \binom{\ell + g}{g}, \text{ where } \binom{\ell + g}{g}$$

is a binomial coefficient representing a number of coefficients in the polynomial;

(b) a seed $$s = (s_1, s_2) \text{ consists of } s_1 \in \mathbb{F}_{2^w}^{\ell},$$

representing l field elements used as evaluation points, and $$s_2 \in \mathbb{F}_{2^m}^{w/m},$$

representing field elements used for dot product, where m is a positive integer representing an output length in bits; and (c) an output of the extractor Ext is $<r(s_1), s_2>$, wherein polynomial evaluation $y=r(s_1)$ is performed over the finite field $$\mathbb{F}_{2^w}$$

by evaluating the polynomial defined by r at the point $s_1$, and dot product $\langle y, s_2 \rangle$ is performed over $$\mathbb{F}_{2^m}$$

by computing an inner product of y and $s_2$.

10. The method of claim 6, wherein the first random string r has a length based on a predetermined target ciphertext length that is stored in the non-transitory computer-readable memory.

11. The method of claim 6, further comprising outputting the plaintext message m to a user interface or transmitting the plaintext message m to another computing device.

12. A computerized system for multi-user incompressible encryption and decryption, the system comprising:

a. a non-transitory computer-readable memory storing instructions and data, the data comprising a predetermined target ciphertext length;

b. a hardware processor coupled to the non-transitory computer-readable memory and configured to execute the instructions to:

i. for encryption of a message m received from at least one user of a plurality of users:

(A) instantiate a functional encryption scheme comprising a setup algorithm, a key generation algorithm, an encryption algorithm, and a decryption algorithm, wherein the setup algorithm generates a master secret key msk and a master public key mpk;

(B) generate a random variable v and define a function $f_v$ based on v, wherein $f_v$ receives an input (s', flag), where s' is a composite string and flag is a binary flag, and outputs s' when flag=0 and outputs s'$\oplus$v when flag=1, wherein $\oplus$ denotes a bit-wise exclusive-or (XOR) operation;

(C) derive a secret key $sk_v$ by executing the key generation algorithm based on $f_v$ and msk;

(D) generate a first random string r having a length based on the predetermined target ciphertext length;

(E) generate a second string u comprising a seed component s and a pad component t;

(F) encrypt u using mpk to generate a ciphertext c;

(G) apply a somewhere randomness extractor Ext to r using s as a seed, wherein the somewhere randomness extractor is a function $Ext:\{0,1\}^n \times \{0,1\}^d \rightarrow \{0,1\}^w$, wherein $\{0,1\}^n$ denotes the set of n-bit binary strings, n is a positive integer representing an input length in bits, d is a positive integer representing a seed length in bits, and w is a positive integer representing an output length in bits, that guarantees a fraction of extracted outputs are statistically indistinguishable from uniform when applied to correlated sources with sufficient joint min-entropy;

(H) derive a value z by computing $z=Ext(r; s)\oplus t\oplus m$; and (I) output and store the value z, r, and ciphertext c in the non-transitory computer-readable memory, wherein the value z, r, and c together constitute a complete encrypted output;

ii. for decryption of an encrypted message:

(A) retrieve the ciphertext c, the first random string r, the value z, and the secret key $sk_v$ from the non-transitory computer-readable memory;

(B) process $sk_v$ and c using the decryption algorithm to derive a string s', wherein s' comprises the random seed s and the random pad t;

(C) decompose s' into the seed component s and the pad component t;

(D) apply the somewhere randomness extractor Ext to the first random string r using the random seed s as a seed; and (E) derive the plaintext message m by computing $m=Ext(r; s)\oplus t\oplus z$;

c. a communication interface coupled to the processor and configured to transmit the ciphertext c over a network to a receiver.

13. The system of claim 12, wherein the somewhere randomness extractor Ext satisfies a property that for a positive integer T and for any T random variables $X_1, \ldots, X_T$ with joint min-entropy rate $\alpha$, where $\alpha$ is a value between 0 and 1, there exists a random variable $I_X$ denoting a subset of at least $\beta \cdot T$ indices, where $\beta$ is a value between 0 and 1 representing a minimum fraction of indices for which extraction guarantees hold, such that extracted outputs $Y_i=Ext(X_i; S_i)$ for $i \in I_X$, where i is an index ranging from 1 to T, are statistically indistinguishable from uniform even given all seeds $S_i$ and all other extracted outputs not in said subset $I_X$.

14. The system of claim 13, wherein the somewhere randomness extractor Ext(r; s) is constructed based on Reed-Muller codes, wherein:

(a) an input $r \in \{0,1\}^n$, where $\{0,1\}^n$ denotes the set of n-bit binary strings, is interpreted as an l-variate polynomial of total degree g over a finite field $$\mathbb{F}_{2^w}$$

having $2^w$ elements, where l is a positive integer representing a number of variables in the polynomial, g is a positive integer representing total degree of the polynomial, w is a positive integer representing a field size parameter, and n is determined by $$n = w \cdot \binom{\ell + g}{g}, \text{ where } \binom{\ell + g}{g}$$

is a binomial coefficient representing a number of coefficients in the polynomial;

(b) a seed $$s = (s_1, s_2) \text{ consists of } s_1 \in \mathbb{F}_{2^w}^{\ell},$$

representing l field elements used as evaluation points, and $$s_2 \in \mathbb{F}_{2^m}^{w/m},$$

representing field elements used for dot product, where m is a positive integer representing an output length in bits; and (c) an output of the extractor Ext is $\langle r(s_1), s_2 \rangle$, wherein polynomial evaluation $y=r(s_1)$ is performed over the finite field $$\mathbb{F}_{2^w}$$

by evaluating the polynomial r at the point $s_1$, and dot product $\langle y, s_2 \rangle$ is performed over $$\mathbb{F}_{2^m}$$

by computing an inner product of y and $s_2$.

15. The system of claim 12, wherein the functional encryption scheme is a single-key selectively secure functional encryption scheme.

16. The system of claim 12, wherein the network comprises at least one of the Internet, a local area network, or a wide area network, and wherein the communication interface is configured to electronically transmit encrypted messages to receivers associated with the plurality of users.

\* \* \* \* \*